(12) United States Patent
Doshi et al.

(10) Patent No.: US 6,349,138 B1
(45) Date of Patent: *Feb. 19, 2002

(54) METHOD AND APPARATUS FOR DIGITAL TRANSMISSION INCORPORATING SCRAMBLING AND FORWARD ERROR CORRECTION WHILE PREVENTING BIT ERROR SPREADING ASSOCIATED WITH DESCRAMBLING

(75) Inventors: Bharat Tarachand Doshi, Holmdel; Subrahmanyam Dravida, Freehold; George John Kustka, Marlboro; Peter D. Magill, Freehold, all of NJ (US); Curtis A. Siller, Andover, MA (US); Kotikalapudi Sriram, Marlboro, NJ (US)

(73) Assignee: Lucent Technologies Inc., Murray Hill, NJ (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/841,510

(22) Filed: Apr. 23, 1997

Related U.S. Application Data
(60) Provisional application No. 60/019,788, filed on Jun. 14, 1996.

(51) Int. Cl.[7] .............................................. H04N 7/167
(52) U.S. Cl. ........................ 380/200; 380/210; 714/751
(58) Field of Search ........................ 371/41, 49.1, 49.3; 714/800, 802, 52, 57, 746, 751, 752, 798, 799; 375/324; 395/568; 380/200, 210

(56) References Cited

U.S. PATENT DOCUMENTS

| 5,140,596 | A | * | 8/1992 | Weldon ...................... 714/762 |
| 5,357,527 | A | * | 10/1994 | Coates et al. ............... 371/37.4 |
| 5,617,333 | A | * | 4/1997 | Oyamada et al. ........... 364/514 |
| 5,754,734 | A | * | 5/1998 | Emeott et al. .............. 395/2.35 |
| 6,026,164 | A | * | 2/2000 | Sakamoto et al. .......... 380/217 |

OTHER PUBLICATIONS

William Stalling, Data and Computer Communications, fourth edition, 1994, pp. 72–73.*

Data and Computer Communications, William Stallings, 80–87, 104–105, 136–137, 145–150,415, 1994.*

William Stallijgs, Data and Computer Communications, pp. 136–137, 1994.*

* cited by examiner

Primary Examiner—Gail Hayes
Assistant Examiner—Ho S. Song

(57) ABSTRACT

The specification relates to a method and apparatus supporting multiple access, bi-directional data and multimedia transfer described over a hybrid fiber/coax (HFC) network, though applicable to transmissions over other media as well. The protocol associated with the present invention supports downstream broadcast transmission from headend to cable modem, and also provides for allocation of bandwidth for cable modems to transmit back to the headend. The protocol supports different access modes such as STM, ATM, and VL; within each subframe of a subframe/frame/masterframe structure. The protocol is utilized over a system which provides for forward error correction (FEC) and scrambling/descrambling, while eliminating the deleterious effects on the error correcting capability of the FEC due to the bit error spreading associated with a scrambling/descrambling function. The protocol adapts to changing demands for a mix of circuit and packet mode applications and allocates upstream and downstream bandwidth in response to the a variety of bursty and isochronous traffic sources.

14 Claims, 16 Drawing Sheets

$i + x^6 + x^7$ $i + x^{14} + x^{15}$

METHOD AND APPARATUS FOR DIGITAL TRANSMISSION INCORPORATING SCRAMBLING AND FORWARD ERROR CORRECTION WHILE PREVENTING BIT ERROR SPREADING ASSOCIATED WITH DESCRAMBLING

CROSS REFERENCES TO RELATED APPLICATIONS

This application claims the benefit of U.S. Provisional Application No. 60/019,788, filed on Jun. 14, 1996. This application is related to another U.S. Patent Application, having a filing date of Apr. 3, 1997, and Ser. No. 08/832,255, entitled "Method and Apparatus Enabling Multiple Access for Multiple Services and Multiple Transmission Modes Over a Broadband Communication Network Utilizing an Adaptive Digital Access Protocol," (DOSHI 19-22-13-13-8-9) having common inventors and a common assignee.

FIELD OF THE INVENTION

This invention relates generally to digital communications and multimedia information transfer, and, in particular, to scrambling, descrambling, and forward error correction of digital transmission.

BACKGROUND OF THE INVENTION

Modem data and multimedia transmission systems provide a flexible, cost-effective platform for offering a wide range of telecommunications services to residences and businesses. Some of the envisioned applications provided by these services include Internet access, the ability to communicate with the office while working at home, voice and video telephony, interactive game playing, etc. Whether the transmission medium is coaxial cable, wireless, or optical fiber; and whether the system is multipoint to multipoint, point to multipoint, multipoint to point, or point to point; these systems generally provide for forward error correction (FEC) and data scrambling. FEC is a technique used by a receiver to identify and correct errors incurred in transmission over a communications channel without requiring retransmission of any information by the transmitter. Typically, FEC is implemented by applying an algorithm to data to generate redundant bits at the transmitter, performing the same algorithm on data at the receiving end, and comparing the transmitted calculation with the received calculation. Data scrambling is utilized to ensure that a receiving modem's clock remains synchronized to the transmitting clock. Scrambling accomplishes this function by ensuring that an adequate number of bit transitions from '0' to '1' and from '1' to '0' occur. A loss of clock synchronization at the receiver relative to the transmitter is known as receiver drift. Receiver drift will normally occur only when the transmitter transmits either "1's" or "0's" without transition for an extended period of time.

Scrambling, although necessary to prevent receiver drift by controlling the one's density, is also problematic because scrambling increases the error rate. This phenomenon is known as bit error spreading and occurs at the receiver when a descrambler attempts to restore the data to its original, "pre-scrambled" state. A bit error introduced into a data stream during transmission is "spread" to other bits because the algorithms utilized to produce the scrambling/descrambling functions rely on each bit, including a bit that is in error, to reconstruct the value of subsequent bits at the receiver and thus restore the original bit values.

The problem of bit error spreading is further complicated with the addition of FEC at the receiver. Conventional systems implementing both scrambling and FEC functions first FEC encode a portion of data to be transmitted. The result of FEC encoding is known as an FEC syndrome. The FEC syndrome is concatenated with the data from which it was derived and then scrambled. Traditionally, FEC was actually performed at the application layer and scrambling/descrambling was performed with the transmission system at the physical layer. A more recent trend is to design systems which perform both FEC and scrambling/descrambling at the physical layer, although preserving the original order of first FEC encoding and then scrambling the data. Performing FEC at the physical layer does not preclude performing additional FEC at the application level.

At the receiver, data is first descrambled and then passed to an FEC decoder. Since descrambling introduces bit errors to bits other than those corrupted during the transmission process, FEC must identify and correct a greater quantity of errors than were introduced during transmission. One consequence of such an arrangement is that system FEC capability may be exceeded, even though errors introduced during transmission could have been corrected by FEC at the receiver were it not for bit error spreading induced by the scrambling/descrambling function. When the error correcting capability of FEC is surpassed, the data is corrupted, cannot be corrected, and therefore requires retransmission. When system designers anticipate bit error spreading, they devote a greater quantity of overhead for FEC. However, this method of compensating for bit error spreading requires a great amount of redundant transmission and is inefficient. What is needed is a method and a system, which includes the scrambling and FEC functions of conventional systems, without adding to system cost or system complexity and still provide for adequate quality of service.

SUMMARY OF THE INVENTION

The present invention is a method and apparatus that supports data and multimedia transmission over a flexible, cost-effective platform and enabling a wide range of telecommunications services to residences and businesses. Further, the present invention eliminates the problems associated with bit error spreading and is applicable over a multiplicity of mediums, including coax, wireless, and fiber. Although the present invention is described as being incorporated within a broadband, bi-directional, multiple access, hybrid fiber/coax system, it is not so limited and can equally well be incorporated within a multipoint to multipoint, point to multipoint, multipoint to point, or point to point system.

The present invention is implemented at the transmitter by first scrambling data prior to calculation of an FEC syndrome. After scrambling, the FEC syndrome is calculated and then concatenated with the scrambled data. The concatenated data is transmitted as a subframe to a receiver or receivers. Therefore, the transmitted subframe is partially scrambled (the data portion) and partially unscrambled (the FEC syndrome). Problems with receiver drift due to a loss of synchronization are circumvented by controlling the total length of each subframe and by controlling the length of the FEC syndrome included within each subframe. The present invention inherently allows shorter FEC syndrome length, while preserving the error identification and correction power of traditional systems, due to the avoidance of the deleterious effects of bit error spreading.

At the receiver, data is first FEC decoded and then descrambled. Therefore, FEC is utilized at the receiver to identify and correct bit errors introduced during transmission, prior to a received bit error being descrambled, thus preventing bit error spreading. As a consequence, less overhead is dedicated to FEC for the same degree of error correction capability, and improved FEC performance and system efficiency is achieved without increasing the cost or complexity of the system.

BRIEF DESCRIPTION OF THE DRAWINGS

A more complete understanding of the present invention may be obtained from consideration of the following description in conjunction with the drawings in which.

DETAILED DESCRIPTION

An Adapt Overview

The present invention encompasses a system utilizing a broadband link protocol, which specifies physical (PHY) and medium access control (MAC) layers over a broadband communication network. The broadband link protocol utilized in conjunction with the present invention will hereinafter be referred to within this application as an adaptive digital access protocol (ADAPT). A variety of traffic types are time division multiplexed and modulated for integrated transport within a single radio frequency (RF) channel, or if desired, are segregated onto separate RF channels, subject to spectrum allocation and administration by a headend (HE) bandwidth manager. These traffic types include synchronous transfer mode (STM) service data units, asynchronous transfer mode (ATM) service data units and variable length (VL) service data units.

Although the present invention is particularly well suited for bi-directional hybrid fiber/coax (HFC) networks with tree and branch topologies, and shall be so described with respect to this application, the present invention also relates to cellular wireless networks, which are akin to fiber/coax networks, in that mobile stations do not directly communicate with each other, but instead depend on a base station for feedback. Therefore, since one embodiment of the present invention is described in the context of a "headend" and a "cable modem," it is understood that the present invention may also function in the context of its wireless network counterparts. For example, in a wireless network, the functional equivalent of a "headend" is a "common controller" at a cellular base station and the functional equivalent of "cable modems" are "mobile stations" or simply "stations."

Further, the present invention is also applicable to one-way HFC networks, wherein cable transport is only in the downstream (broadcast) direction, without provision for upstream bursts from cable modems to the headend.

FIGS. 1 through 26, and the accompanying detailed description contained herein, are to be used as an illustrative example of a preferred embodiment of the present invention, and should not be construed as the only manner of practicing the present invention. Numerous modifications and alternative embodiments of the invention will be apparent to those skilled in the art in view of the following description. Details of the structure may be varied substantially without departing from the spirit of the invention.

Figure 1:
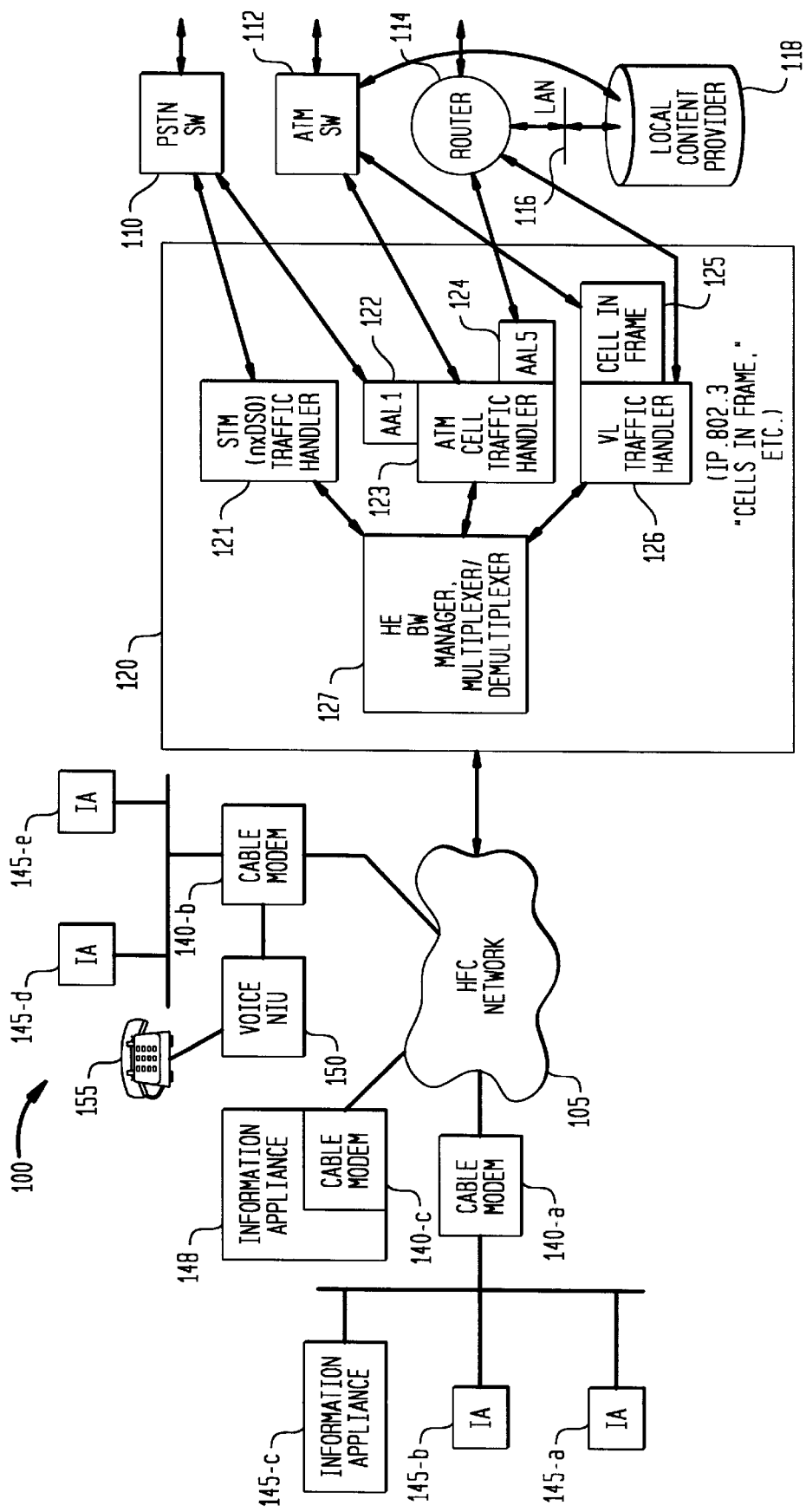
FIG. 1 illustrates an exemplary arrangement of a broadband hybrid fiber/coax network utilized in accordance with the present invention, the network connecting a headend to a plurality of cable modems for downstream signal broadcasting and allowing upstream information transmission from the individual cable modems back to the headend as well.

FIG. 1 illustrates an exemplary system operator's network 100 with which the present invention may be used. An HFC network 105 is comprised of coaxial cable with tree and branch topology, point-to-point optical fiber, or a combination of both and is characterized by a wide bandwidth. Typically, a 54–750 Megahertz (MHz) band is utilized for downstream (broadcast) cable television (CATV) frequency bands, and the frequencies between 5–42 MHz are reserved for upstream communications. The HFC 105 allows the system operator to connect cable modems to the end users. A headend (HE) 127 is maintained at the system operator's premises 120. The HE 127 performs certain core functions, including transmission to and reception from the HFC network 105, bandwidth management for upstream and downstream communications and data transfer, as well as signal multiplexing and demultiplexing.

For example, a public switched telephone network (PSTN) 110 as shown in FIG. 1 is linked to the HE 127 through a synchronous transfer mode (STM) traffic handler 121. The STM traffic handler 121 is then linked with the HE 127. Also, the PSTN 110 can route traffic through an ATM adaptation layer (AAL) 122. By so doing, the AAL 122 converts non-ATM bit streams into ATM cells, which are then processed by the ATM cell traffic handler 123 before again being passed to the HE 127 for downstream delivery over the HFC network 105.

ATM traffic enters the system operator's premises 120 from an asynchronous transfer mode switch (ATM SW) 112, which delivers ATM cells to the ATM cell traffic handler 123. In turn, the ATM cell traffic handler 123 communicates with the HE 127, which then transmits those cells onto the HFC network 105. The ATM SW 112 can alternatively deliver ATM packets to a variable length (VL) traffic handler 126 after first converting those packets into proper VL form. This conversion takes place at the cell in frame processor 125 located at the system operator's premises 120. The VL traffic handler then forwards the data to the HE 127 for ultimate transmission over the HFC network 105.

A local content provider 118 is shown providing input to the system operator's premises 120 for ultimate dissemination over the HFC network 105. The local content provider 118 is connected to a local area network (LAN) 116. The LAN 116, in turn, is connected to a router 114, which provides the necessary interface for data from the LAN 116. The router 114 sends data directly to the VL traffic handler 126 or, if so directed, sends data through a ATM adaptation layer (AAL) 124. The AAL 124 converts non-ATM byte streams into ATM cells, which are then processed by the ATM cell traffic handler 123 before being passed to the HE 127 for downstream delivery. Data passed to the VL traffic handler 126 is converted into VL type format and is passed to the HE 127 directly for downstream delivery. Router 114 is also connected to Internet Protocol (IP) type networks (e.g.—Internet or Corporate Intranet). In this sense, HFC provides access to this Wide Area Data Network. Data units (e.g.—IP datagrams) arrive at router 114 from the outside network and are handled as those arriving from the local content provider 118.

Communications and data broadcasted over the HFC network are ultimately available at cable modems 140-a, 140-b and 140-c. The cable modem 140 converts the incoming data and communications into information usable by the information appliances 145-a to 145-e. An information appliance 145 can be a computer terminal, a phone 155, or some other processing or communication device; and a cable modem 140-c may be incorporated into the information appliance 148 itself. Additionally, a cable modem 140 may be used to provide telephony or video by utilizing a network interface unit (NIU) between the cable modem 140 and the information appliance. For example, cable modem 140-b is connected to a voice NIU 150, which provides the necessary continuity and conversion for use with a phone 155.

As previously stated, bandwidth is allocated upstream as well as downstream, so that information appliances can communicate with the HE 127. In the case of upstream transmission the sequence of processes and components described above are simply reversed. The processes performed by the HE 127 for downstream transmission are performed by the individual cable modems 140 for upstream transmission. Since the downstream communications are over a broadcast medium and the upstream communications are over a multiple access medium, there are some fundamental differences in the communication protocols for upstream and downstream transmission.

Figure 2:
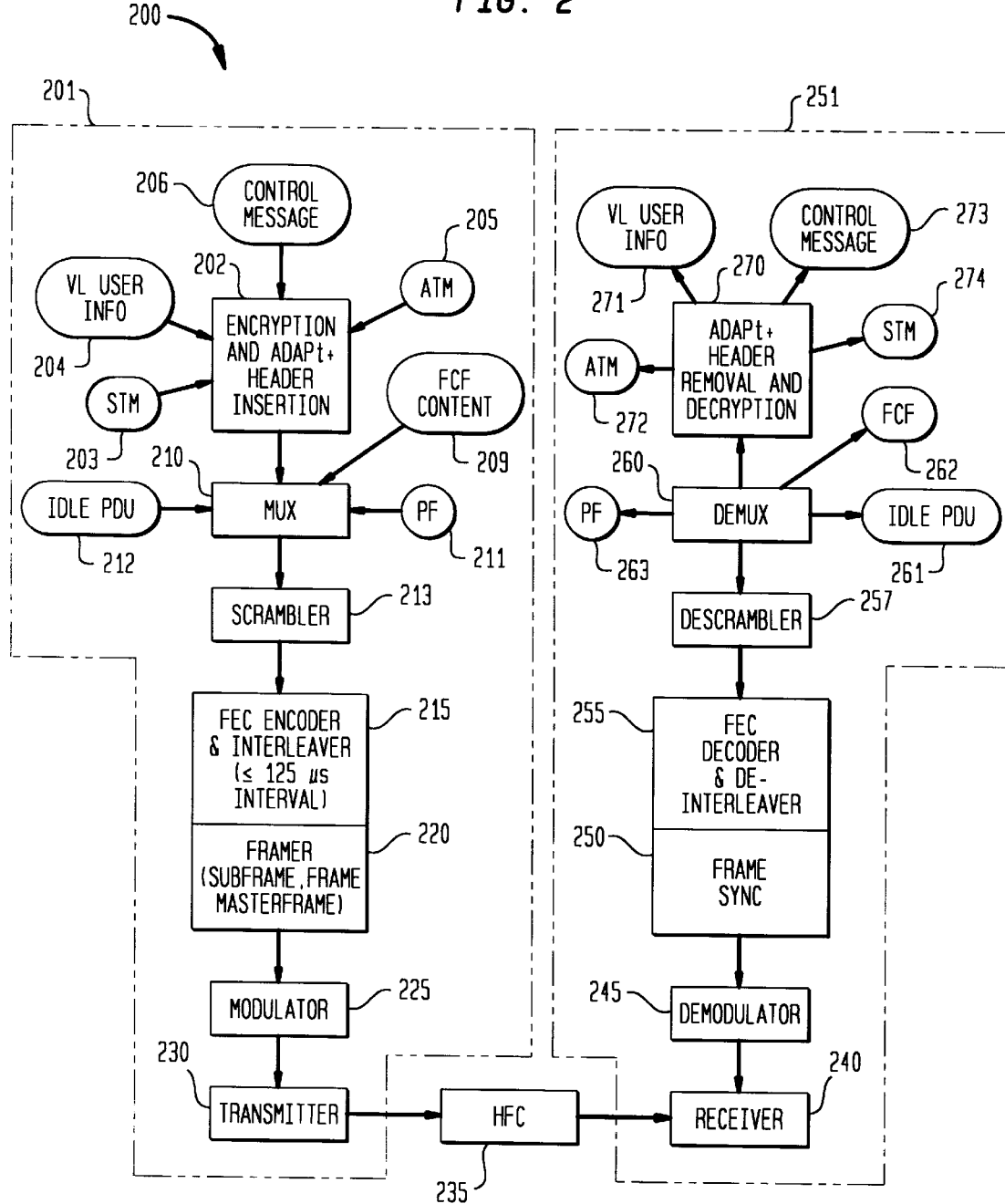
FIG. 2 is a block diagram illustrating an exemplary grouping of functional components utilized for downstream transmission in accordance with the present invention.

FIG. 2 is a block diagram illustrating an exemplary downstream transmission system 200 utilized in accordance with the present invention. Components utilized for transmission prior to broadcast over the hybrid fiber/coax (HFC) network are located at an operator's headend 201. At higher levels, queues are maintained for periodically arriving synchronous transfer mode (STM) and STM signaling bytes 203, for variable length (VL) data units 204, for fixed length asynchronous transfer mode (ATM) cells 205, and for control messages (206) which are transported as VL protocol data units (PDUs). VL data units may be of various types, including internet protocol (IP), internet packet exchange (IPX), IEEE standard 802.3 (802.3), or other variable length protocol data units (PDUs). The various queued PDUs are first processed by an encryptor 202, wherein after queued data is encrypted, an adaptive digital access protocol (ADAPT) header is appended. The output stream of the encryptor 202 is delivered to a multiplexer 210.

Traffic types other than those passing through the encryptor 202 are also generated at the headend 201. During periods when ATM, VL, or STM PDUs are not being transmitted from the headend 201 within their corresponding regions, an Idle PDU 212 is generated and transmitted. The headend 201 also generates a pointer field (PF) 211 and a fast control field (FCF) 209. Pointer fields 211, fast control fields 209, and Idle PDUs 212 are each delivered to the multiplexer 210 as well.

The various PDUs, PF, and FCF are then multiplexed into a subframe, frame, and masterframe structure. A scrambler 213 is utilized to maintain the symbol density of the transmitted data. The next functional block is a forward error correction (FEC) encoder and interleaver 215. The present invention utilizes a Reed Solomon coding scheme for forward error correction, although other methods of FEC may also be used, as would be apparent to those skilled in the art. FEC is completed within the subframe boundary to avoid excessive jitter, which will be described in more detail later.

The output of the FEC encoder 215 is then prefixed with a framing byte at the framer 220, passed through a modulator 225 and broadcasted over the hybrid fiber/coax network 235 via a transmitter 230 for ultimate reception at individual cable modems 251.

The broadcasted signal is available to each cable modem receiver 240 tuned to this downstream channel. After passing through a demodulator 245, a framing byte identifies the boundary of a subframe. The payload subframe boundary is determined via a frame synchronizer 250 which analyzes the included framing byte. The framing byte is then removed and the payload is passed through the FEC decoder/deinterleaver combination 255. The output from the FEC decoder/interleaver is sent to the descrambler regardless of the outcome of FEC operations. The subframe payload is then descrambled at a descrambler 257 and made available to a demultiplexer 260 at the cable modem. The demultiplexer 260 removes the PF 263, the FCF 262, and any idle PDUs 261 which may have been included in the transmission. The remainder of the received data stream is sent through a decryptor 270 to remove the ADAPT header and decrypt the encrypted data. Various payload components are separated and processed, as will be described later in greater detail. These payload components include VL PDUs 271, ATM PDUs 272, STM PDUs 274, and control messages 273 carried as VL PDUs.

As previously stated, bandwidth is allocated upstream as well as downstream. Upstream transmission is conceptually similar to downstream transmission. For the case of upstream transmission from cable modem to headend, the processes identified in conjunction with FIG. 2 for downstream transmission are performed in the same sequential order. However, the direction of transmission is now reversed, with the cable modem performing the functions of encrypting, multiplexing, scrambling, framing, modulating, and transmitting. Similarly, for the case of upstream transmission, the headend performs the functions of receiving, demodulating, frame synchronizing, descrambling, demultiplexing, and decrypting.

There are, however, several important differences between upstream transmission and downstream transmission. First, users "burst" into an upstream frame, synchronized with the received downstream frame, and under strict time-domain control established by ranging and managed from the headend (HE). The HE determines when a cable modem may burst upstream and onto which of several upstream channels the burst may occur. To avoid interference with bursts from other cable modems in the same RF channel, the burst includes pre- and post-guardtimes. Also, a preamble is included, indicating the beginning of data within the burst and allowing for HE receiver locking. Upstream traffic is not interleaved, and forward error correction is applied at the application level within each burst, rather than at the multiplexed bytestream level.

The present invention maintains an equal frame length for downstream transmission and upstream transmission, each two milliseconds for this illustrative embodiment. Downstream frames are further subdivided into an integral number of subframes per frame. This illustrative embodiment of the present invention utilizes sixteen subframes per frame, each subframe being 125 microseconds long. Subframes are divided into four regions: a synchronous transfer region (STR), an asynchronous transfer region one (ATR1), an asynchronous transfer region two (ATR2), and a fast control field (FCF). The STR transports isochronous traffic; ATR1 transports ATM cell PDUs; ATR2 transports VL PDUs, including both bearer data and ADAPT control messages; and the FCF transports real time control information. A pointer field (PF) is also included within each subframe. The PF indicates the segmentation of a VL PDU which spills over into the next subframe.

Unlike downstream transmission, upstream burst transmission is not divided into subframes. Rather, each two millisecond upstream frame is divided into a synchronous transfer region (STR) and an asynchronous transfer region (ATR). The upstream ATR frame is further divided into three regions: a contention-based region for upstream signaling and control messages; a contention based region for bandwidth requests; and a reserved region for bearer traffic. An upstream ATR is constructed from basic slots, used for bandwidth requests in a contention mode and used to serve as a basic unit of granularity for time slot allocation with ATM and VL PDUs. For example, an ATM cell always uses six consecutive basic slots while a VL PDU uses a variable number of basic slots to better support ranging and more efficiently transport VL packets. Six basic slots are utilized to comprise a superslot.

The following description of one embodiment of the present invention precisely defines many specific values, components, and functions so as to completely illustrate the present invention. Various modifications can be made to the present invention, as would be apparent to those skilled in the art, including but not limited to specific values corresponding to masterframe, frame, and subframe timing and construct, type of modulation and demodulation employed, and bandwidth allocated for downstream and upstream transmission. For the remainder of the description of this embodiment of the present invention, downstream transmission frequency is assumed to be 5.12 Msym/s and the method of downstream modulation elected is 64 quadrature amplitude modulation (64 QAM). These elections result in a raw bit transfer rate of 30.72 million bits per second (Mbps). Similarly, the upstream transmission frequency is assumed to be 1.28 Msym/s and the method of upstream modulation elected is quaternary phase shift keying (QPSK) at 2 bits per symbol. These elections result in a raw bit transfer rate of 2.56 million bits per second (Mbps). Accordingly, the specific number of bytes per masterframe, frame and subframe, as well as the quantity of each within the transmission structure, are dependent on the elections made and will necessarily change if different transmission bandwidths or modes of modulation are chosen.

Downstream Transmission

Figure 3:
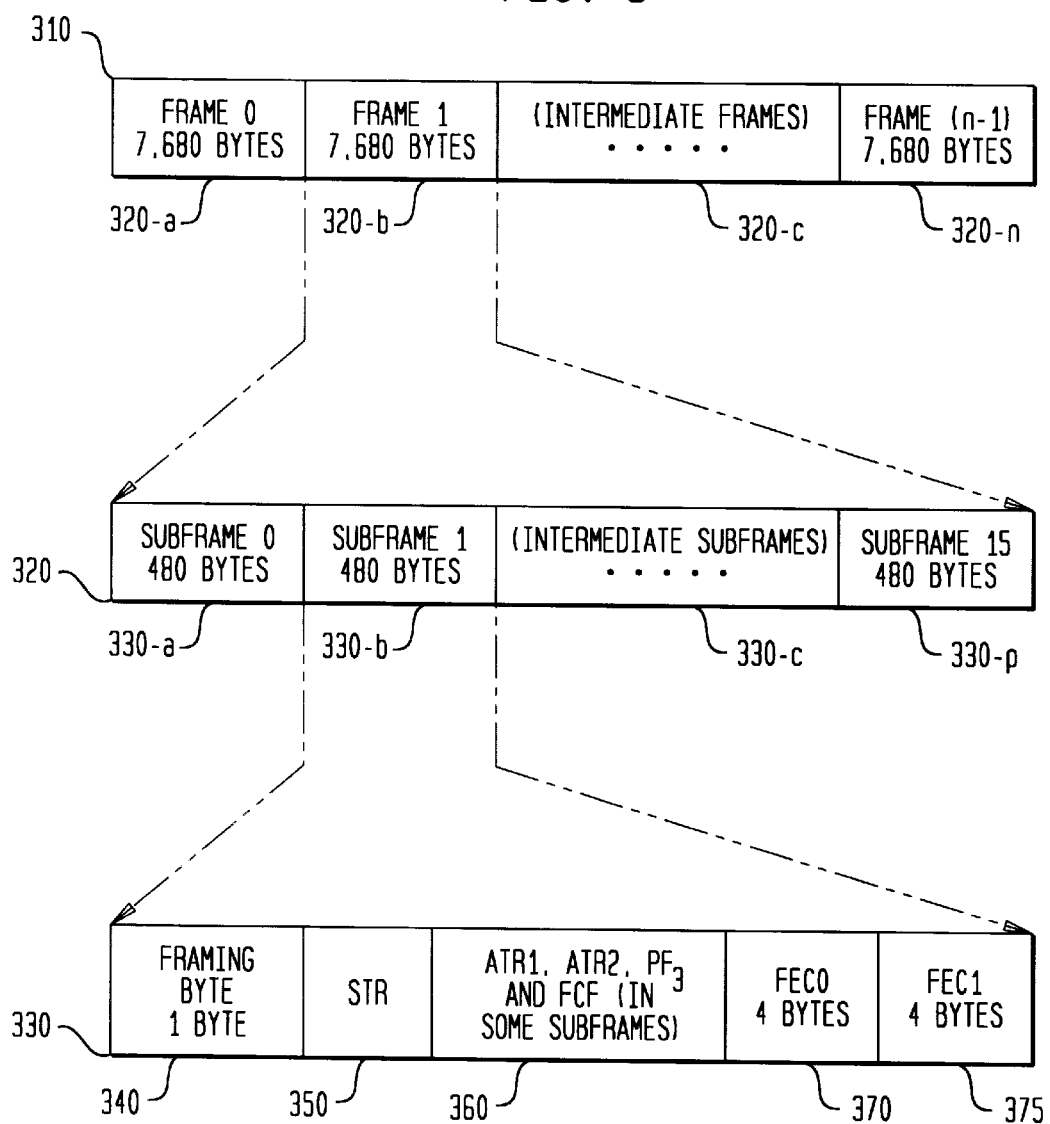
FIG. 3 is a representation of an exemplary embodiment of a downstream masterframe/frame/subframe structure as incorporated in accordance with the present invention.

FIG. 3 is a representation of an exemplary embodiment of a downstream frame structure of the present invention. A masterframe 310 is comprised of an integral number, n, of frames 320. The illustrated masterframe 310 is shown to contain frame zero 320-*a*, frame one 320-*b*, frame (n–1) 320-*n*, and an undefined number of intermediate frames 320-*c*. Since each frame 320 is two milliseconds long, and since there are n frames in each masterframe, each masterframe 310 is total of n times two milliseconds in length. Each frame 320 is comprised 7,680 bytes over two milliseconds and therefore each masterframe is comprised of n times 7,680 bytes.

Each frame 320 is comprised of sixteen subframes 330, therefore each subframe is 125 microseconds long. A typical frame, frame one 320-*b*, is shown exploded into its constituent sixteen subframes 330-*a* through 330-*p*. Intermediate subframes two through fourteen 320-*c* are shown only as a block of intermediate subframes for the sake of brevity and clarity. Each subframe is comprised of 480 bytes.

Subframe one 330-*b* is shown in exploded view to illustrate the details and various regions of a subframe. Included within a subframe are one framing byte 340, a synchronous transfer region 350, an asynchronous transfer region 360 and two blocks utilized for forward error correction (FEC). FEC0 370 includes four bytes coded in parallel from even numbered payload bytes within each subframe. FEC1 375 includes four bytes coded in parallel from odd numbered payload bytes within each subframe. More detail regarding FEC will be revealed later in this section of the application. Since each subframe 330 is comprised of 480 bytes, and one byte is dedicated to framing and eight bytes are dedicated to forward error correction, there is a total of 471 bytes utilized for information carrying within each subframe 330.

Figure 4:
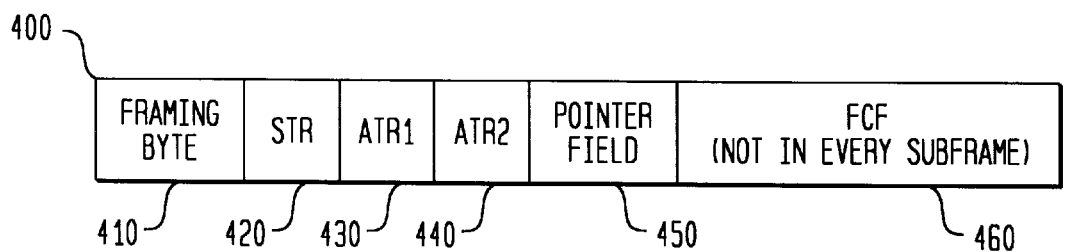
FIG. 4 is an exemplary representation for a division of information carrying bytes within a subframe into five regions.

FIG. 4 is an exemplary representation for the division of the 471 bytes dedicated to information carrying within a subframe 400 into five regions. The five regions include the synchronous transfer region (STR) 420, asynchronous transfer region one (ATR1) 430, asynchronous transfer region two (ATR2) 440, a pointer field (PF) for ATR2 450, and a Fast Control Field (FCF) 460. While it is likely that each of the first four regions will exist within each subframe of a frame, the FCF 460 is present only in the last $n_u$ subframes of each frame, where $n_u$ is the number of upstream channels associated with the specific downstream channel over which the FCF 460 is broadcasted. Also shown is the framing byte 410 that is included within each subframe.

The STR 420 transports synchronous PDUs in byte format. ATR1 430 transports fixed length ATM cells as PDUs and ATR2 440 transports variable length (VL) asynchronous PDUs. The PDUs may carry user information or may carry signaling and control information. The fast control field (FCF) 460 has a subfield which provides information about the boundary between ATR1 430 and ATR2 440 in the subsequent subframe. ATR1 430 and ATR2 440 collectively are known as the asynchronous transfer region (ATR). Because VL PDUs may be segmented and therefore partially transmitted in one subframe, a two byte pointer field (PF) 450 is used to specify the beginning location of the first full VL PDU in the next subframe.

Figure 5:
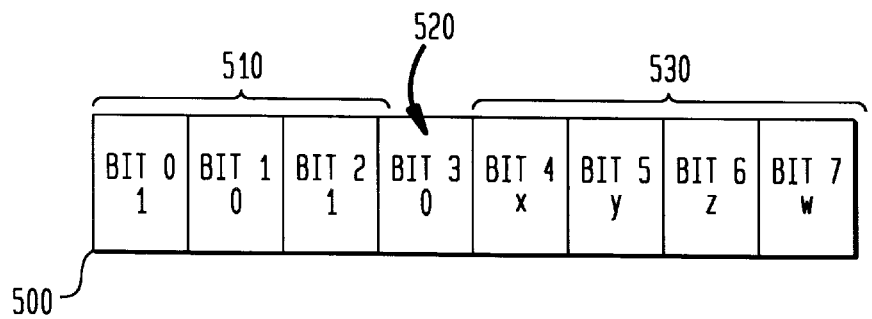
FIG. 5 is an exemplary representation of a subframe framing byte as utilized in accordance with the present invention.

FIG. 5 is an exemplary representation of a framing byte as utilized in accordance with the present invention. The first byte of a subframe is dedicated to a framing byte 500. The leftmost three bits (three most significant bits) of the eight bit pattern constitute a fixed marker pattern (FMP) 510, whose bits are fixed at '101.' The fourth most significant bit is a masterframe marker 520, whose value is '1' in each of the sixteen subframes in the first frame of a new masterframe, otherwise the masterframe marker 520 value is '0.' The four least significant bits represent a subframe counter 530. The subframe counter 530 consecutively represents each successive subframe within a frame with a different bit combination for 'xyzw,' and therefore can completely represent each of the sixteen subframes within a frame with a different bit combination value. An exemplary embodiment of the present invention simply assigns the value '0000' to 'wxyz' for the first subframe in each frame, and increments the subframe counter 530 by one for each sequential subframe, until the sixteenth and final subframe within a frame assigns '1111' to 'xyzw.'

Cable modem receivers, or station receivers in a cellular wireless environment, utilize the framing byte 500 to synchronize to subframe boundaries, and additionally to synchronize to frame and masterframe boundaries. Synchronization is needed when a cable modem initially joins the system or after a loss of synchronization. In either case, the receiver identifies each occurrence of the bit patterns '1010xyzw' or '1011xyzw,' and then identifies the bit pattern after 479 bytes to check that the subframe counter 530 has incremented by one. One exemplary embodiment of the present invention elects to repeat this bit pattern check four times prior to declaring cable modem synchronization to a subframe boundary. It is understood that the number of bit pattern checks prior to declaring synchronization may vary from one embodiment to another. Requiring more checks than four will ensure, with a greater degree of accuracy, that a synchronization has in fact occurred. Conversely, performing a bit pattern check fewer than four times reduces the likelihood that a correct declaration of subframe synchronization has occurred.

Once cable modem synchronization to a subframe boundary has been accomplished, the cable modem looks to the subframe counter to identify the position of the subframe within a frame and thus identifies the frame boundary. Having already identified the subframe and frame boundary, the masterframe boundary is identified utilizing the known boundary information and the masterframe marker 520.

The first region of information carrying bytes within a subframe is the synchronous transfer region (STR). The STR is dedicated to synchronous traffic, allocating one byte of payload per payload per active voice channel (DS0) connection. For a synchronous connection requiring an integral number, n, of voice channels per connection (n times DS0), a total of n bytes per subframe, not necessarily contiguous, are allocated per connection. In addition to the bytes reserved for DS0 and n times DS0 traffic in each subframe, one byte is provided within the STR for call supervision signaling and trunk processing information to DS0 based public switched telephone network (PSTN) network interfaces for each group of sixteen or fewer DS0 channels. The position of the DS0 byte within the STR identifies a specific DS0 connection. This mapping, established when the connection is set up, allows for simple synchronous operation at the receiver for creating a DS0 stream by extracting one byte per subframe.

The second region of information carrying bytes within a subframe is ATR1, followed by ATR2. Together, ATR1 and ATR2 comprise the asynchronous transfer region (ATR). The boundary between the STR and ATR1, and between ATR1 and ATR2, is fixed within a frame, but may be changed from frame to frame. Changing the boundaries between each of these regions is accomplished via the HE bandwidth manager (BM). The resulting division of these regions and their respective boundaries are conveyed to cable modem receivers via the FCF. The FCF specifies the STR/ATR1 and ATR1/ATR2 boundaries for the next downstream frame.

The present invention includes an integrated HE designed to facilitate three modes of transmission, STM, ATM PDUs, and VL PDUs, and further supporting various combinations of cable modems. Some cable modems are capable of supporting only STM transmissions, some support only ATM PDU transmission, and still others support any combination of two of the above modes of transmission or all three. As previously described, information regarding the length of the STR, ATR1, and ATR2 regions is provided to all cable modems in FCFs, regardless of their ability to process certain modes of transmission. For example, after the FCF has been processed and interpreted at an individual CM which is capable of supporting only VL PDU transmission and reception, the CM will utilize appropriate information regarding the length and position of ATR2, and receive and process VL PDUs contained within that region, while disregarding information specific to the STR region or ATR1. Thus, the present invention facilitates the utilization of simple, inexpensive cable modems that enable operation in only one or two modes, such as the modem that only processes VL PDUs in the above example, while maintaining comprehensive and complete transmission and reception capability for those cable modems, incorporated within the system, that facilitate transmission of all three modes.

Figure 6:
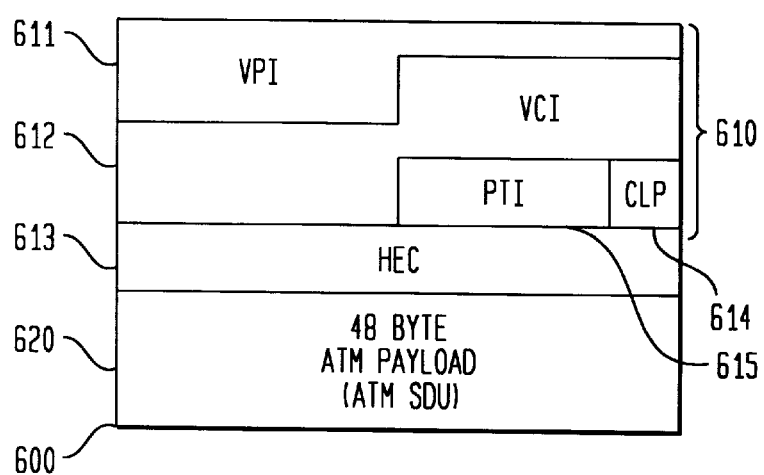
FIG. 6 is an exemplary illustration, in accordance with the present invention, of byte allocation for an ADAPT PDU with an ATM cell as payload.

FIG. 6 is an exemplary illustration, in accordance with the present invention, of byte allocation for an ADAPT ATM PDU 600. ATM PDUs are transmitted downstream within ATR1 of the asynchronous transfer region. ATR1s in successive subframes are concatenated to provide a bytestream for carrying ADAPT ATM PDUs 600, thereby allowing ATM PDUs 600 to cross subframe, frame, and masterframe boundaries. A five byte ATM header serves as both an ATM cell header and as an ADAPT header 610. In a standard network-to-network interface (NNI) format, an ATM header and therefore an ADAPT header 610 as well, contains the following fields: a twelve bit virtual path identifier (VPI) 611, a sixteen bit virtual channel identifier (VCI) 612, an eight bit header error control field (HEC) 613, a one bit cell loss priority field (CLP) 614, and a three bit payload type identifier (PTI) 615.

Cable modem receivers process the first five bytes of every PDU in the ATR1 bytestream to verify the HEC field 613. The polynomial utilized for HEC, '$1+x+x^2+x^8$', the correction and detection states, and the transitions are standard to ATM cells with a NNI format. With fixed length ATM cells in the byte stream generated by concatenated ATR1s, the standard ATM cell delineation method, being well known by those skilled in the art, is used for ADAPT PDU delineation at the receiver. After verifying HEC 613, the cable modem receiver analyzes the VPI 611 to see if the PDU is destined for that cable modem. The ATM header VPI 611 is utilized by the present invention as a surrogate for the receiving cable modem address.

When there are not enough ATM cells queued at the HE to completely fill the current ATR1, the portion of ATR1 that is otherwise unused is filled with idle ATM PDUs. An idle ATM PDU is fifty-three bytes in length, and therefore maintains synchronization within ATR1. The five byte ATM header for an idle ATM PDU includes a virtual path identifier (VPI), used as a surrogate cable modem address, just as an ATM PDU with payload does. The VPI for an idle ATM PDU is set to '1111 1111 1111,' which is a discard address. The forty-eight byte pseudo-payload is appended to the header to maintain proper spacing and synchronization within ATR1, but no data is appended within that space. Idle ATM PDUs therefore, provide a method of padding ATR1 when the headend bandwidth manager allocates more bandwidth to ATR1 than required for the downstream transmission of ATM cells queued at the headend.

Figure 7:
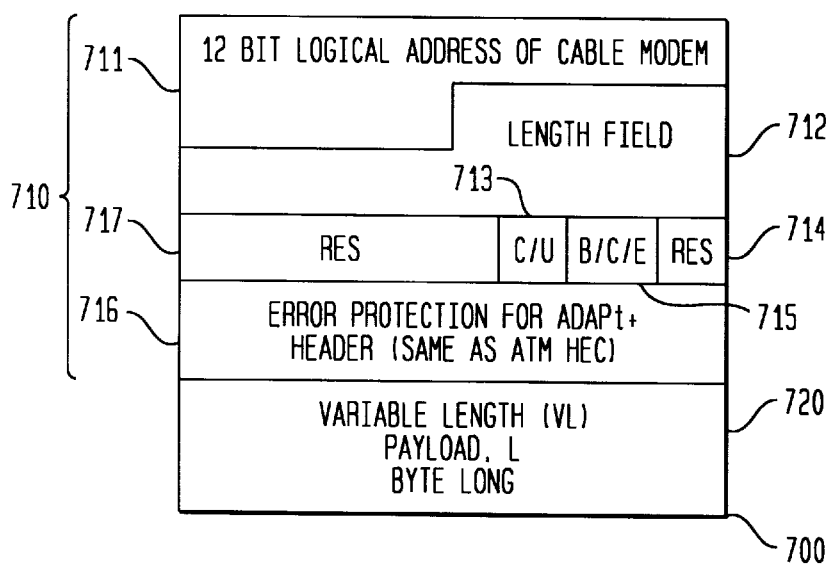
FIG. 7 illustrates an exemplary variable length (VL) payload with an ADAPT header for downstream transmission, in accordance with the present invention.

FIG. 7 illustrates an exemplary variable length (VL) payload with an ADAPT header for downstream transmission, in accordance with the present invention. ADAPT VL PDU segments 700 are transmitted within the second asynchronous transfer region, ATR2. ATR2s from successive subframes are concatenated to create a bytestream for VL PDUs. It is important to note the difference in terminology between an ADAPT VL PDU segment 700 and a VL PDU. A VL PDU represents the data frame or datagram from a higher level variable length PDU. An ADAPT VL PDU segment 700, however, is a VL PDU which has been segmented to a size no greater than MAXSIZE. An ADAPT VL PDU segment 700 is transmitted downstream within ATR2. Cable modem receivers process the segments as a VL PDU bytestream and reestablish the original characteristics of the VL PDU. An ADAPT VL PDU segment 700 may alternatively be referred to as a "VL PDU segment," a "VL segment," a "PDU segment," or simply as a "segment." A VL PDU may alternatively be referred to as a "VL frame," a "VL datagram," or a "higher level VL PDU."

The payload 720 of an ADAPT VL PDU segment can be the whole or a portion of an Internet protocol (IP) datagram, an I.E.E.E. 802.3 frame (802.3), or an ADAPT control message. The payload may also be one or more ATM cells sent back-to-back to the same cable modem, in which case the ATM headers for all but the first ATM cell in the ADAPT VL PDU segment 700 are redundant and may be removed.

An ADAPT VL PDU segment 700 contains a five byte header 710 which includes the following fields within it: a twelve bit logical address 711 for the destination cable modem, a twelve bit length field, a one bit C/U field 713, a two bit B/C/E field 715, an eight bit HEC field 716, a one bit field reserved for future use 714, and a three bit field reserved for future use 717. The HEC field 716 within an ADAPT VL PDU segment 700 protects the entire five byte header 710 and provides for the capability for single bit error correction. The size of the header 710 and the HEC field 716 are identical to those for ATM cells. The polynomial, correction and detection states, and transitions are also the same as those of the ATM HEC.

The one bit C/U field 713 is used to specify whether the present ADAPT VL PDU segment 700 contains user information or a control message. The two bit B/C/E field 715 specifies whether the VL PDU segment carries the beginning, continuation, or end segment of a higher level PDU. A beginning segment VL PDU segment is indicated with a B/C/E field 715 equal to '00,' a continuation segment VL PDU segment is indicated with a B/C/E field 715 equal to '01,' an ending segment VL PDU segment is indicated with a B/C/E field 715 equal to '10.' If a higher level VL PDU is carried as payload within a single ADAPT VL PDU segment 700, the B/C/E field 715 is equal to '11.'

The twelve bit length field 712 can specify an ADAPT VL PDU segment 700 up to 4095 bytes. Accounting for the five byte VL header, a total of 4090 bytes of VL payload may be described by the length field. An exemplary embodiment of the present invention therefore specifies the maximum length in bytes, MAXSIZE, for an ADAPT VL PDU segment 700. Therefore, if a higher level VL PDU is to be transmitted downstream and is larger than MAXSIZE minus five, the higher level VL PDU will first be segmented into one or more segments and transmitted downstream as separate ADAPT VL PDU segments 700, concatenated at the receiver, and reassembled with the aid of information from the B/C/E field 715.

Idle PDUs fill the unused portions of ATR2. The format for an idle PDU transmitted in ATR2 is the same as that of an ADAPT VL PDU segment 700. An idle PDU has a B/C/E field 715 equal to '11,' since the payload is of zero length and fits in one ADAPT VL PDU 700. The cable modem logical address 711 is the discard address of '1111 1111 1111.' The length of the payload is zero, therefore the length field 712 is equal to '0000 0000 0000.'

The twelve bit logical address 711 for the destination cable modem is explicitly specified in the VL header. Various addresses out of the 4095 possible combinations for this field are reserved and not used as specific cable modem addresses. Some examples include reservation for broadcast addresses, reservation as a discard address utilized in conjunction with idle PDUs, reservation for multicasting. Logical addresses not reserved for other purposes are available for identification of individual cable modems.

As introduced earlier, the ATR2s of successive subframes are concatenated to provide an ATR2 bytestream facilitating the transmission of VL PDUs. Since each VL PDU segment 700 contains a length field 712 in its header, a receiving cable modem is able to discern the VL PDU segment boundary from the bytestream, thus identifying the end of one VL PDU segment and the beginning of the next sequential VL PDU segment. In this fashion, a cable modem is self synchronizing. However, when a cable modem first joins the network, it needs to identify the first VL PDU segment boundary in order to establish synchronization. Also, a cable modem which receives or processes erroneous data may cause the receiver to lose synchronization. Therefore, a two byte pointer field is incorporated at the end of each ATR2 within a subframe to provide for quick resynchronization with a VL PDU segment boundary.

Because ATR2 is treated as a bytestream, the last VL PDU segment 700 in the ATR2 of a subframe can cross subframe, frame, and masterframe boundaries. VL PDU segments will appear in consecutive order in the ATR2s of successive subframes until the entire higher level VL PDU is transmitted. At the end of each subframe, the headend recognizes the number of bytes transmitted and the number of bytes remaining to completely transmit a VL PDU segment. The HE also knows the length of the STR and ATR1 regions. This information is utilized to provide for VL PDU segment boundary identification at the receiver.

Figure 8:
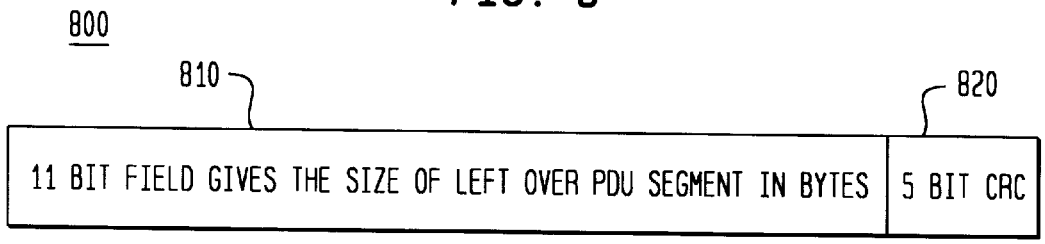
FIG. 8 represents an exemplary embodiment of a two byte pointer field (PF), in accordance with the present invention.

FIG. 8 represents an exemplary embodiment of a two byte pointer field (PF) 800, in accordance with the present invention. The bits of the PF are divided into two distinct fields. First, a length field of eleven bits 810 is dedicated to conveying information about the remaining untransmitted length of an ADAPT VL PDU segment at the end of the instant subframe. A five bit error protection field 820 is also included within the PF 800. The error protection field dedicates four bits for the result of a cyclic redundancy code (CRC) calculation and one bit for parity.

Figure 9:
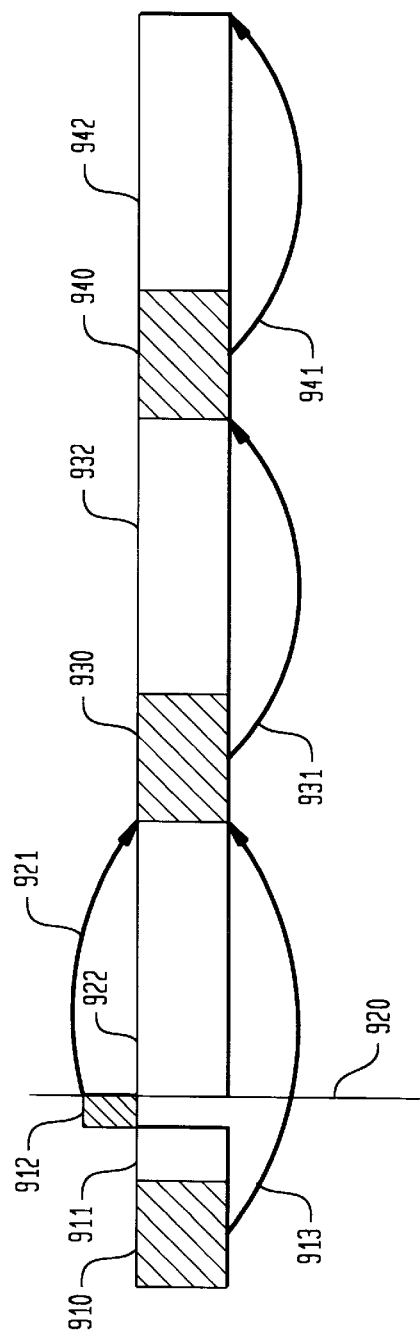
FIG. 9 is an exemplary illustration of the utilization of length field information contained within a downstream ADAPT VL PDU segment header, combined with a subframe pointer field, to mark the end/beginning of individual PDUs.

FIG. 9 is an exemplary illustration, in accordance with the present invention, of the utilization of the length field contained within a downstream ADAPT VL PDU segment header and a subframe PF to mark the boundary between adjacent VL PDU segments within an ATR2 bytestream. The VL PDU segment header 910 of a segment which has not been completely transmitted within a subframe boundary provides total segment length information about its associated PDU segment payload 911. The total length in this illustrative example is shown to traverse the subframe boundary 920 and the remainder of the PDU segment payload 911 is transmitted in the subsequent subframe as PDU segment payload 922. Length arrow 913 describes the PDU segment payload total length and points to the beginning of the next VL PDU segment header. Pointer Field (PF) 912 provides direct information regarding the byte position of the beginning of the header of the first full PDU segment in the next subframe. Thus, in effect, the PF 912 points to the same location as does the length field in the header 910. PF is particularly useful when one or more PDUs are discarded due to transmission errors. When one or more PDUs are discarded, the subsequent PDU boundary cannot be easily identified without a PF. Including PF within a PDU therefore allows PDU boundary identification at the next subframe.

The next sequential VL PDU segment header 930 provides total length information for its respective VL PDU segment payload 932 by pointing 931 to the beginning of the next VL PDU segment header 940. Similarly, the following VL PDU segment header 940 provides total length information for its respective VL PDU segment payload by pointing 941 to the beginning of the next sequential VL PDU segment header.

The process described above, therefore, marks the beginning of the first ATR2 PDU segment in the next sequential subframe, allowing for synchronization and resynchronization to an ADAPT VL PDU segment boundary. This synchronization process, however, is only necessary for initial identification of a VL PDU segment boundary, or for resynchronization after a synchronization loss. Once initial synchronization is achieved, implicit and explicit length information is utilized for continuing self synchronous operation. Also, the VL PDU segment header HEC is used for each VL PDU segment, for further confirmation of synchronization within VL PDU segments.

Figure 10:
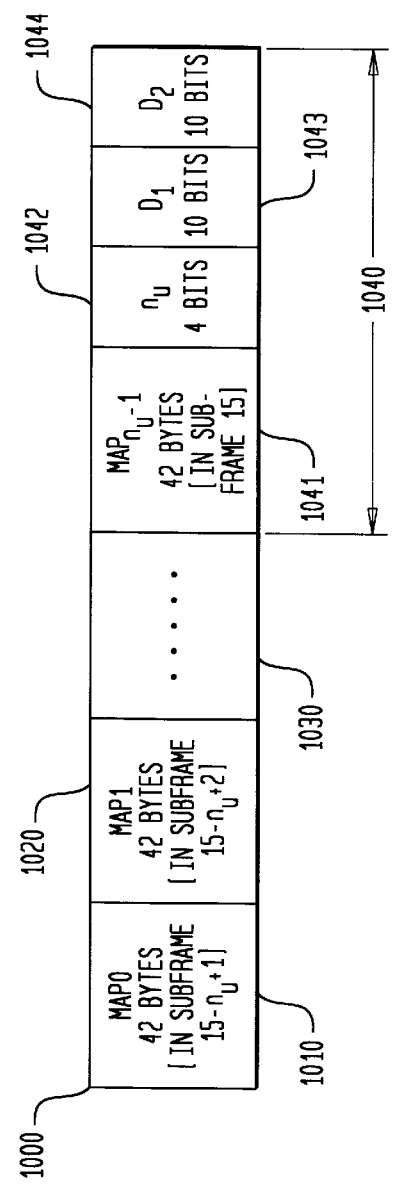
FIG. 10 is an exemplary depiction of a downstream fast control field (FCF), as utilized in accordance with the present invention.

FIG. 10 is an exemplary depiction of a downstream fast control field (FCF) 1000 as utilized in accordance with the present invention. Although a field within the asynchronous transfer region (ATR), the FCF 1000 is confined within a frame. The FCF 1000 is included in the last $n_u$ subframes of every frame, just after the two byte PF. The purpose of the FCF 1000 is to control the basic operation of the ADAPT medium access control (MAC) in real time. This aspect is particularly important, since the control information transported between headend and modem through the FCF tends to be relatively delay sensitive. In particular, the FCF 1000 provides six types of information to individual cable modems. First, the FCF 1000 informs the cable modems of the location of the boundary between the STR and the ATR1. Second, the FCF 1000 informs the cable modems of the location of the boundary between the ATR1 and the ATR2. Third, the FCF 1000 informs the cable modems of the location of the boundary between the STR and ATR for upstream transmission. Fourth, the FCF 1000 provides the cable modems with success/failure results from the contention slots of the previous upstream frame. Fifth, the FCF 1000 informs the cable modems of the reservation/contention status of each upstream basic slot for the next upstream frame. Lastly, the FCF 1000 informs the cable modems of basic slot allocation within the ATR for the next upstream frame.

The downstream FCF contains one upstream ATR MAP for each upstream channel, each MAP being forty-two bytes in length. MAP0 1010 is that portion of an FCF which is transmitted in subframe ($16-n_u$), where $n_u$ is the number of upstream channels associated with the downstream channel. MAP1 1020 is that portion of an FCF which is transmitted in subframe ($17-n_u$). Intermediate MAP fields 1030 are also transmitted in subsequent subframes until the last subframe within a frame. MAP($n_u-1$) 1041, along with fields $n_u$ 1042, $D_1$ 1043, and $D_2$ 1044, are the final portions of an FCF to be transmitted within each frame, and are transmitted in subframe fifteen. That portion of an FCF transmitted in subframe fifteen 1040 is forty-five bytes in length, the $n_u$ 1042, $D_1$ 1043, and $D_2$ 1044 fields comprising an additional three bytes to the forty-two bytes of an accompanying MAP.

The $n^u$ field 1042 is a four bit representation for the number of upstream channels associated with the downstream channel transmitting the FCF 1000. Being four bits, the $n_u$ field 1042 can therefore specify up to sixteen upstream channels with any one downstream channel.

The $D_1$ field 1043 specifies the boundary between the STR and ATR1 in the next downstream frame. The boundary specification is conveyed to the cable modems in terms of length of the STR in bytes. The $D_2$ field 1044 specifies the boundary between the ATR1 and the ATR2 in the next downstream frame, in terms of the sum of the lengths of the STR and ATR1. The boundary specification is conveyed to the cable modems in terms of length of the ATR1 in bytes.

FCF transmission downstream is segmented. The last subframe in every frame carries a forty-five byte MAP for upstream channel number $n_u$–1, the $n_u$ field 1042, the $D_1$ field 1043, and the $D_2$ field 1044. Each of the preceding $n_u$–1 subframes carries a forty-two byte MAP, but no $n_u$ or D fields.

Figure 11:
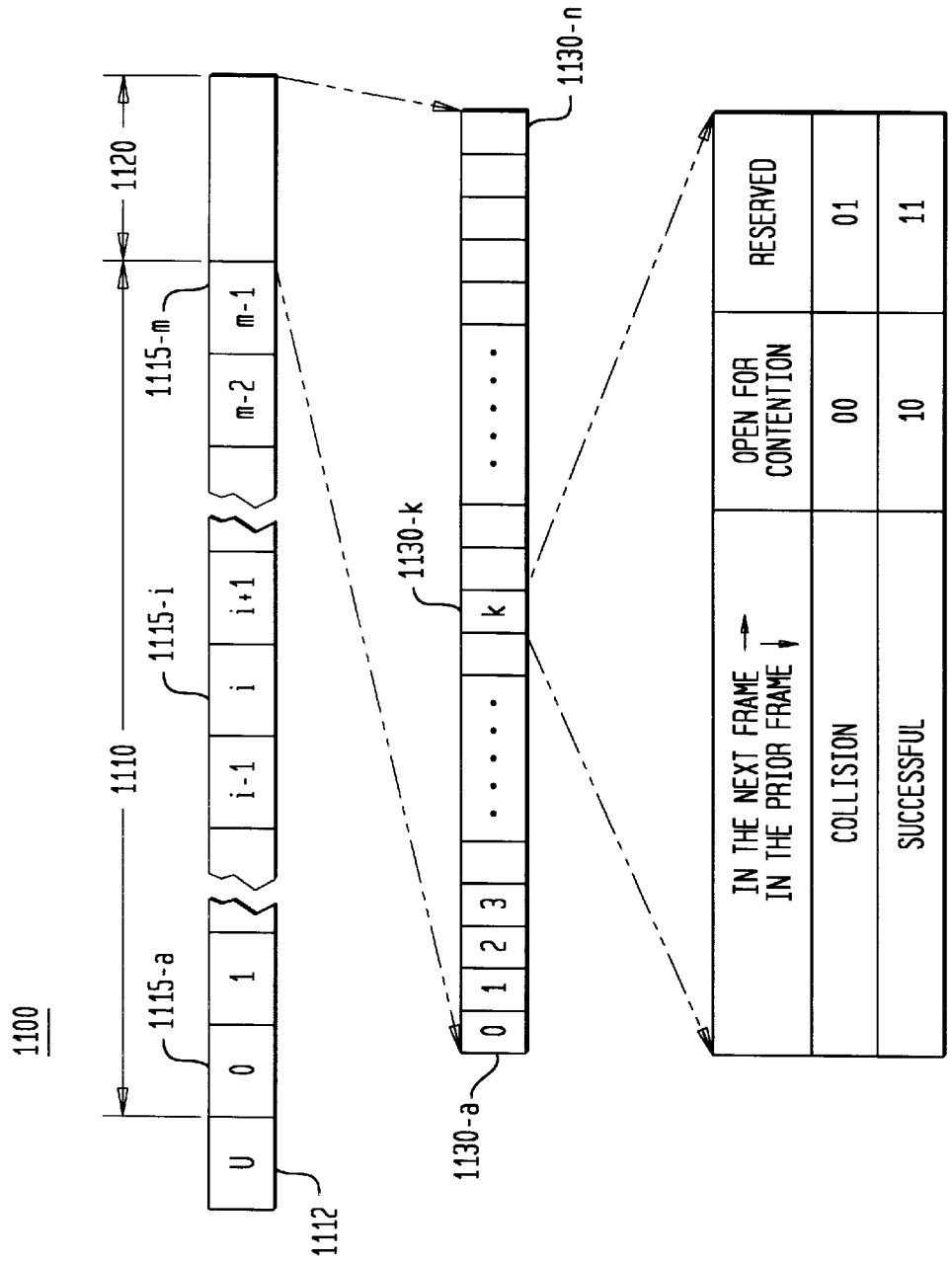
FIG. 11 is an exemplary representation, in accordance with the present invention, of the structure of a downstream MAP field, with exploded view of a status map for basic slots field.

FIG. 11 is an exemplary depiction, in accordance with the present invention, of the structure of a downstream MAP field 1100 with an exploded view of the status map for basic slots 1120. MAP is comprised of three major fields; an upstream boundary specification 1112, an upstream bandwidth allocation map for ATR 1110, and a status map for basic slots 1120.

The upstream boundary specification (U) 1112 conveys to the cable modems the boundary location between the synchronous and asynchronous regions within the next upstream frame. U is an eight bit long binary number and specifies the boundary region in units of basic slots. A basic slot is a subdivision of twelve contiguous bytes within the upstream transmission frame structure. Basic slots will be described in greater detail in this application, specifically during that portion of the detailed description describing upstream transmission.

The upstream bandwidth allocation map for ATR 1110 contains 'm' subfields, 1115-*a* to 1115-*m*. Each subfield 1115 is three bytes in length. Each subfield 1115 is further subdivided into subordinate subfields as well. The upstream bandwidth allocation map for ATR 1110, the subfields 1115, and the subordinate fields will be described in greater detail shortly.

The status map for basic slots 1120, maintains a 2 bit status indicator, 1130-*a* to 1130-*n*, for each basic slot within an upstream frame. The number 'n' represents the maximum number of basic slots in an upstream frame. The status indicator for slot 'k,' 1130-*k*, informs cable modems of the status of slot 'k,' 1130-*k*, in the previous upstream frame (i.e.—whether there was a collision or whether transmission was successful) and reports the status of allocation for slot 'k,' 1130-*k*, in the next upstream frame (whether slot is open for contention or reserved in the next upstream frame). The size of the status map for basic slots 1120 is determined by the number of basic slots 'n.' As will be subsequently described, since the upstream frame size is 640 bytes and since each basic slot is twelve bytes long, the maximum number of basic slots within an upstream frame is fifty-three. If 'n' is chosen to be greater than or equal to the number basic slots, then each upstream frame is adequately provided with a status map for basic slots 1120. Therefore, we can completely define the status for each upstream basic slot. Allocating fourteen bytes to the status map for basic slots field 1120 provides a total of 112 bits. Since a status indicator 1130 is two bits in length, a total of fifty-six status indicators 1130 are available, or 'n' equals fifty-six.

Figure 12:
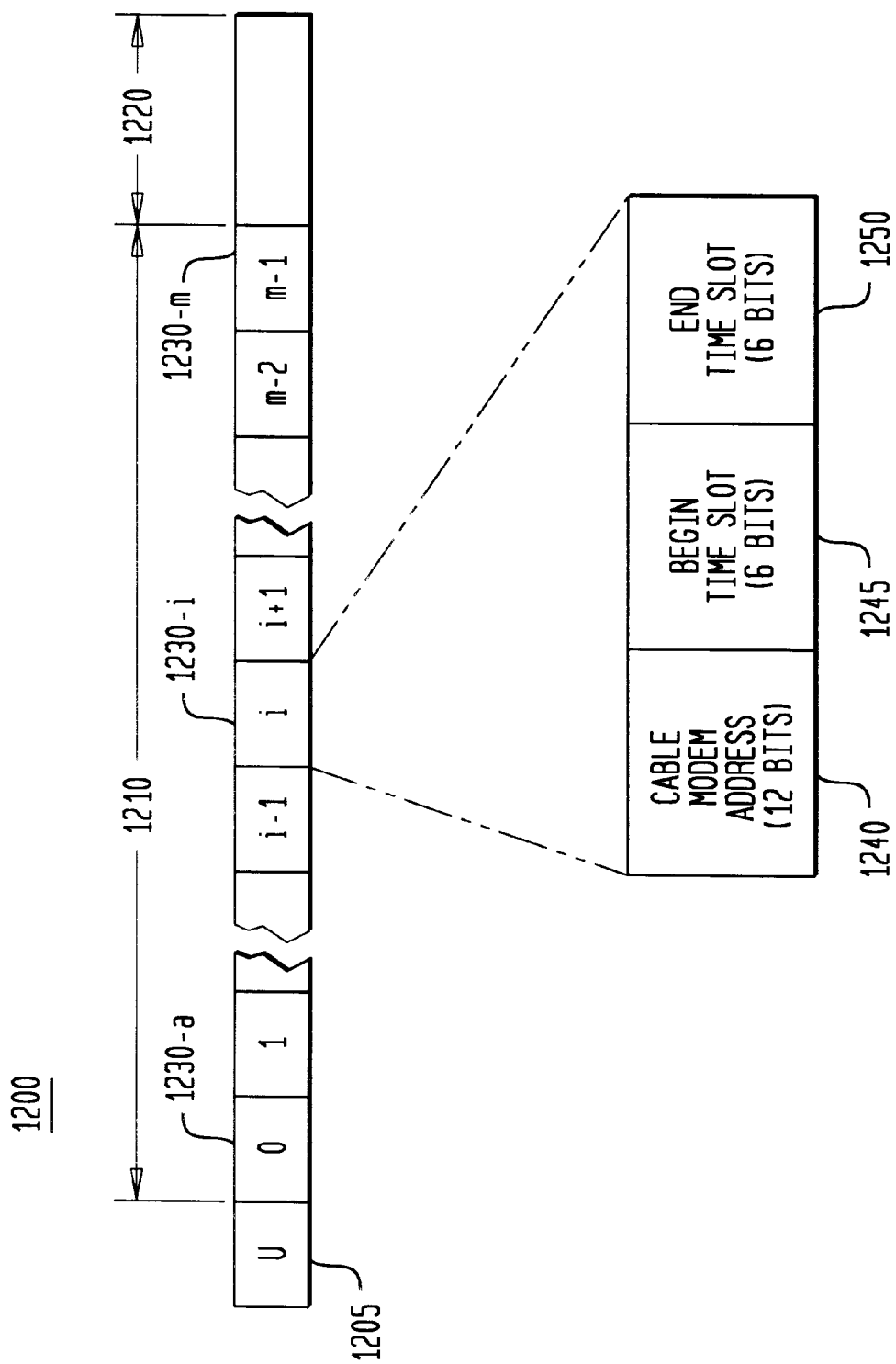
FIG. 12 is an exemplary representation, in accordance with the present invention, of the structure of a downstream MAP field, with exploded view of the upstream bandwidth allocation map for ATR field.

FIG. 12 is another exemplary representation, in accordance with the present invention, of the structure of a downstream MAP field 1200, but this time with an exploded view of the upstream bandwidth allocation map for ATR 1210. Previously examined, but included in this illustration for completeness, are the upstream boundary specification (U) 1205 and the status map for basic slots 1220. The upstream bandwidth allocation map for ATR 1210 contains 'm' subfields, 1230-*a* to 1230-*m*. Each subfield 1230 is three bytes in length and is subdivided into subordinate subfields. A source address subordinate subfield 1240 contains a twelve bit address of the cable modem (CM) for which permission is being granted to transmit in the next upstream frame. Also included as subordinate subfields are the six bit begin time slot 1245 and the six bit end time slot 1250.

The source address subordinate subfield 1240 is used to convey information, from the bandwidth manager at the headend, to the cable modems, about which CM address has been granted permission to transmit in the next upstream frame. In the MAP 1200, the source address subordinate subfield 1240 is used to identify the CM to which the permission is being given, irrespective of whether the cable modem is transmitting and/or receiving ATM traffic, VL traffic, or both. All twelve bits of the source address subordinate subfield 1240 are set equal to '1' to indicate that a specified sequence of basic slots together form an upstream contention superslot for control purposes, such as signaling and ranging. Therefore, the source address subordinate subfield 1240 value of '1111 1111 1111' is not available as a CM address.

As previously noted, there are 'm' subfields 1230 included within the upstream bandwidth allocation map ATR 1210. The value of 'm' must be greater than or equal to the maximum number of possible ATM or VL PDU allocations per frame. Since an upstream frame is composed of 640 bytes, no more than eight complete ADAPT ATM PDUs with payload ATM cells may be transmitted upstream in any one frame. Assuming that an ATM PDU with payload is shorter in length than a VL PDU with payload, then setting 'm' equal to nine provides an adequate number of subfields 1230 within the upstream bandwidth allocation map for ATR field 1210. Therefore MAP default values of 'm' equal to nine and 'n' equal to fifty-six are initially established. The values of 'm' and 'n' may be changed if necessary.

After receiving MAP information in the downstream subframe corresponding to the upstream channel within which a particular CM transmits, each CM allocated within that upstream channel yields to a known fixed offset delay, and then transmits a new upstream frame. The fixed offset delay has a fixed value for each CM, determined individually for each CM, and dependent upon the distance between CM and HE. The value of the fixed offset delay is computed at the HE, and transmitted by the HE to the CM as a slow control message. As previously described, the MAPs for different upstream channels are transmitted in different subframes of a downstream frame and therefore, reception by the HE of upstream messages for different upstream channels are received shifted in time by an integral multiple of the length of a subframe. Accordingly, the upstream frame processing tasks supported at the HE bandwidth manager are distributed over time. That is, generation of MAP information, for transmission in the FCF, is not concentrated in short, computationally dense bursts, but rather extended over many subframes (as many subframes as there are upstream channels). Each two consecutive MAPs for an upstream channel are separated in time by the duration of one frame. Frame duration is selected to be slightly longer than the round trip propagation delay between the headend and the furthest cable modem, plus the processing time needed for MAP generation at the HE, plus the processing time needed at the CM to interpret the MAP. Therefore, the MAP for each upstream frame is guaranteed to arrive at each cable modem within the next upstream frame. As a consequence of the combination of a rapid report time for MAP information and the distribution over time of MAP generation at the HE, streamlined and efficient control over the operation of the medium access control (MAC) for a plurality of upstream channels associated with one downstream channel is maintained.

Figure 13:
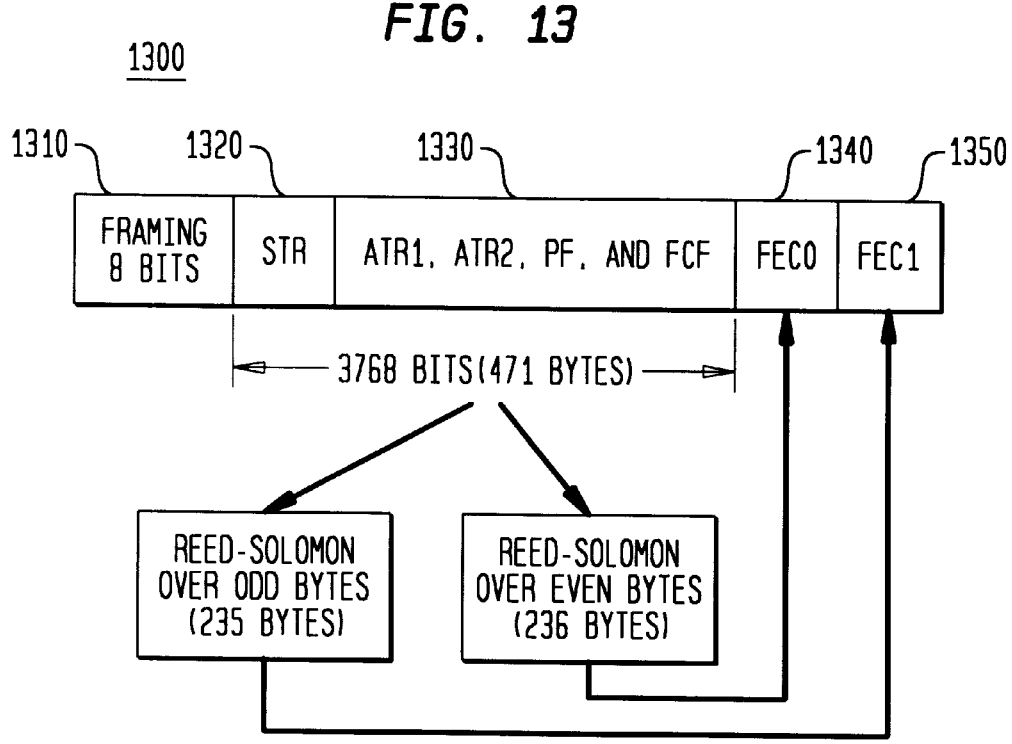
FIG. 13 illustrates an exemplary model for forward error correction (FEC) and interleaving over one subframe of downstream transmission, in accordance with the present invention.

FIG. 13 illustrates an exemplary model for forward error correction (FEC) and interleaving 1300. One subframe of 480 bytes is represented over 125 μs. As previously described, a framing byte 1310 is incorporated within each subframe. Also included in each subframe are eight bytes for forward error correction. This space is divided into two error correction syndromes, FEC0 1340 and FEC1 1350, each four bytes long. Therefore 471 bytes remain for the payload itself, whether allocated within the STR 1320, the asynchronous information and control region 1330, or a combination of both.

Some traffic types, such as compressed video, require a very low residual error rate either because the applications demand a low error rate or because the delay requirements associated with that traffic type preclude an automatic retransmission request (ARQ) type retransmission at the datalink layer. Other traffic types, such as voice telephony, may not allow datalink layer retransmissions but can tolerate moderate error rates.

The present invention utilizes FEC for each subframe payload individually so that the FEC blocks do not traverse subframe boundaries. This arrangement provides for extremely tight jitter control. Each 471 byte payload subframe is divided into two FEC blocks of even and odd bytes. Each of these two blocks is Reed Solomon coded with four bytes of FEC overhead, thus creating a 240 and a 239 byte FEC coded payloads. Although a Reed Solomon coding scheme is utilized for FEC in one embodiment of the present invention, other methods for FEC may also be used, as would be apparent to those skilled in the art. At the transmitter, the two FEC operations are performed in parallel using two FEC coders and thereby avoiding any extra delay in encoding. The transmitter sends the subframe bytes in original order followed by the FEC bytes. Advantageously, the interleaving is performed through FEC blocks of odd and even bytes without changing the order of transmission of data payload bytes (STM and asynchronous data). This arrangement of byte-wise interleaving over a subframe allows delay sensitive traffic within a subframe to be processed at a receiver without an FEC check, and therefore without any additional delay due to interleaving. Also, the byte-wise interleaving over a subframe, as performed in accordance with the present invention at the PHY layer, does not destructively interfere with any upper layer interleaving that has been performed at the application layer.

At the receiver, the two FEC blocks are decoded by passing them sequentially through a single standard FEC decoder thus reducing the cost of a cable modem. Therefore, the FEC utilized with an exemplary embodiment of the present invention is characterized by synchronization within individual subframes and systematic interleaving. Only FEC0 1340 and FEC1 1350 are interleaved. Therefore, synchronizing forward error correction and interleaving within a 125 microsecond subframe utilizing an integral number of FEC blocks provides jitter-free STM transmission, since it is not necessary to receive more than a single subframe of transmission at a cable modem before interpretation of FEC code and deinterleaving. Although the parallel FEC description is with respect to two FEC coders, the present invention may also be utilized generally with an interleaving depth of n, requiring n coders. The exact number of decoders at the receiver may be one, as described herein with respect to sequential decoding or greater, if parallel decoding is desired. The quantity of decoders employed at individual CMs ultimately is a design decision made by the system engineer; balancing the additional cost incurred if each CM were to possess more than one decoder, against the need to mitigate the inherent delay associated with sequential decoding.

Upstream Transmission

Having fully described downstream transmission, with details regarding frame and PDU structure, of an exemplary embodiment of the present invention, a description specifying an exemplary embodiment for upstream frame and PDU structures follows. First, synchronous transfer mode (STM) traffic from voice or video telephony requires strict control of jitter. Because of this requirement, a relatively small sized downstream communication subframe, with a length of 125 microseconds, was chosen. Sixteen subframes were designated to comprise a downstream frame. A suitable frame structure is also required for the upstream direction. High upstream physical (PHY) layer overhead encourages transmitting upstream STM in larger single bursts from the cable modem (CM). Therefore, one embodiment of the present invention utilizes a two millisecond frame structure to match the downstream frame structure and allow for upstream frame synchronization with the equally sized downstream frame. Like the downstream frame structure, an integral number of upstream frames are incorporated into one upstream masterframe. However, unlike the downstream frame, the upstream frame is not comprised of subframes. This combination of upstream frames and masterframes provides a balance between low PHY layer overhead and low packetization delay for STM communications.

For the remainder of the description of exemplary embodiment of the present invention, upstream channel bandwidth is chosen at 1.8 MHz in the 5–42 MHz range and upstream symbol rate is chosen to be 1.28 megasymbols per second (Msym/s). The method of upstream modulation elected is quaternary phase shift keying (QPSK) at 2 bits per symbol. These elections result in a raw bit transfer rate of 2.56 million bits per second (Mbps). Various modifications can be made to the present invention, as would be apparent to those skilled in the art, including but not limited to specific values corresponding to masterframe and frame timing and construction, type of modulation and demodulation employed, and bandwidth allocated to upstream channels. Accordingly, the selection of specific lengths for masterframes and frames, as well as the quantity of each are dependent on the elections made, and will necessarily change if different bandwidths or modes of modulation are chosen.

Figure 14:
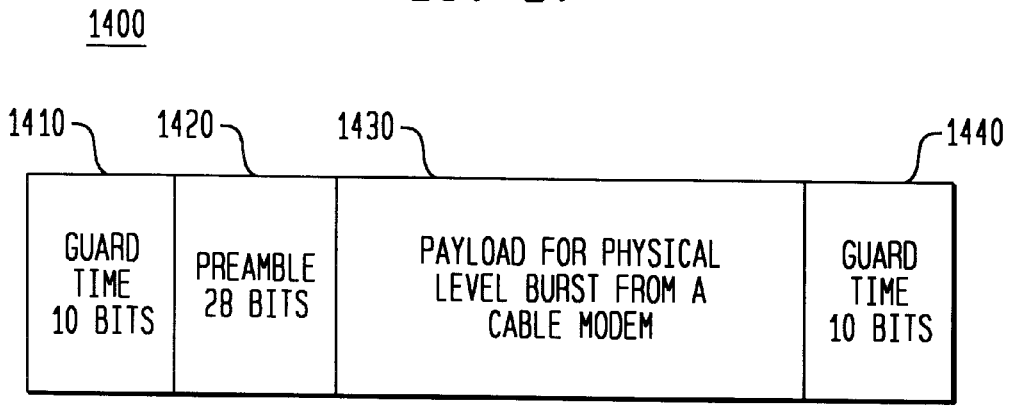
FIG. 14 illustrates an exemplary frame structure, in accordance with the present invention, of an ADAPT upstream burst transmission.

FIG. 14 illustrates an exemplary frame structure 1400, in accordance with the present invention, of an ADAPT upstream burst transmission. A transmission front guard band 1410 and transmission end guard band 1440 are each ten bits long, and a preamble 1420 is twenty-eight bits in length. The preamble 1420 is a fixed bit pattern used to indicate the start of data within a burst. Guard bands are utilized to compensate for inaccuracies inherent with CM ranging and synchronization with the HE.

Figure 15:
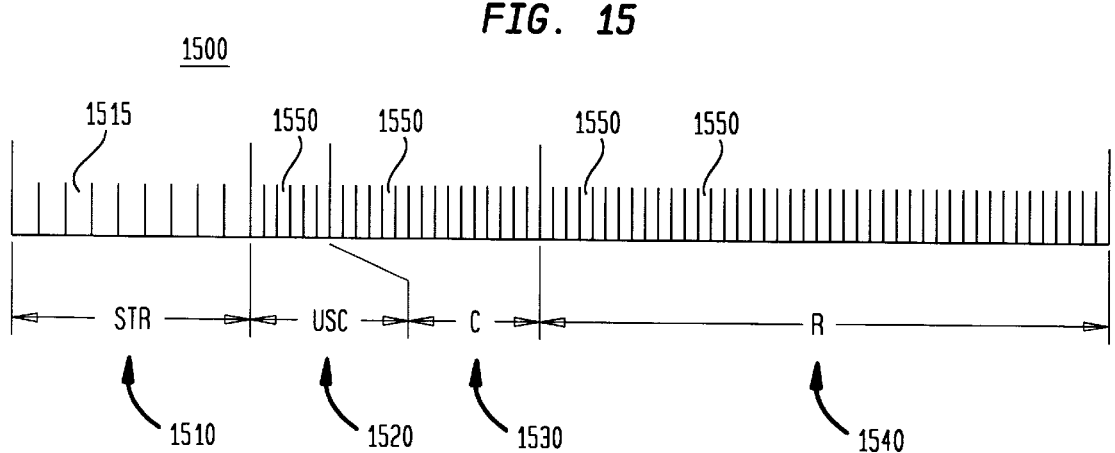
FIG. 15 illustrates an exemplary upstream transmission frame and slot structure, in accordance with the present invention.

FIG. 15 illustrates an exemplary upstream transmission frame 1500 and slot structure, in accordance with the present invention. As previously described, an upstream frame 1500 is two milliseconds long and synchronized with transmitted downstream frames. At 2.56 Mbps, there are a total of 640 bytes available within each frame 1500 and an integral number of frames 1500 comprise a masterframe. A masterframe is synchronized with a corresponding downstream masterframe. The frame structure 1500 consists of four distinct regions; an STR region 1510 for synchronous voice or video telephony communication, an upstream slow control (USC) region 1520, a contention region (C) 1530, and a reserved region (R) 1540.

The STR region 1510 consists of individual DS0 STM time slots 1515, each twenty-seven bytes long. One STM time slot 1515 is dedicated to each upstream DS0 connection. Providing an STM time slot within each upstream frame 1500 allows sixteen bytes of STM information to be transmitted each two milliseconds, thereby facilitating low delay transmission for STM communications.

The upstream slow control region (USC) 1520, contention region (C) 1530, and reserved region (R) 1540 collectively comprise the upstream asynchronous transfer region (ATR). The ATR is composed of a multiplicity of basic slots 1550, each basic slot being twelve bytes in length. Accumulating an integral number of bytes to form a basic slot provides the granularity required for upstream transmission. User data PDU time slots are formed by combining multiple successive basic slots.

The contention region 1530 contains multiple basic slots in each frame. The exact number is variable and is changed by the headend bandwidth manager (BM), depending on loading and collision history. Cable modems use contention slots to request reserved slots in subsequent frames. Contention slots may be assigned contiguously as illustrated in FIG. 15, but are not so restricted. The BM may alternatively split and spread contention slots among any of the basic slots on a per frame basis and communicate the location of those contention slots to the cable modems through a corresponding MAP sent to cable modems in the downstream fast control field (FCF).

The upstream slow control (USC) region 1520 is a configurable region in specified frames within each masterframe. The USC 1520 contains one contention superslot. Being comprised of six basic slots, a superslot is seventy-two bytes long. A superslot allows for the transmission of short messages without first making a reservation request. Some examples of messages appropriate for incorporation within a contention superslot include STM signaling, ranging, control and response messages. The superslot is particularly useful for CM initialization when it initially powers up. Off-hook and other signaling messages for voice and video telephony may also be transmitted in contention mode using superslots. In the event of a collision at a basic slot or a superslot between competing cable modems, a retransmission scheme is incorporated. One embodiment of the present invention includes a retransmission scheme incorporating a binary exponential backoff process. In other embodiments of the present invention, retransmission is accomplished utilizing a ternary tree algorithm or an adaptive p-persistence algorithm.

The reserved region 1540 is available to cable modems in multiples of the basic slot. The MAP of the fast control field (FCF) provides information for which subsets of basic slots in the reserved region are available to which modems. Asynchronous user data PDUs from a CM with reservations for message transmission utilize this reserved region for conveyance of that information. Typically, ATM PDUs and VL PDUs use the reserved region for upstream transmission. Upstream ATM PDUs can be transmitted in six basic slots. The headend BM uses type information to guarantee that all ATM reservations are in blocks of six contiguous slots per frame. Upstream VL PDUs are allocated as many contiguous basic slots as possible.

Figure 16:
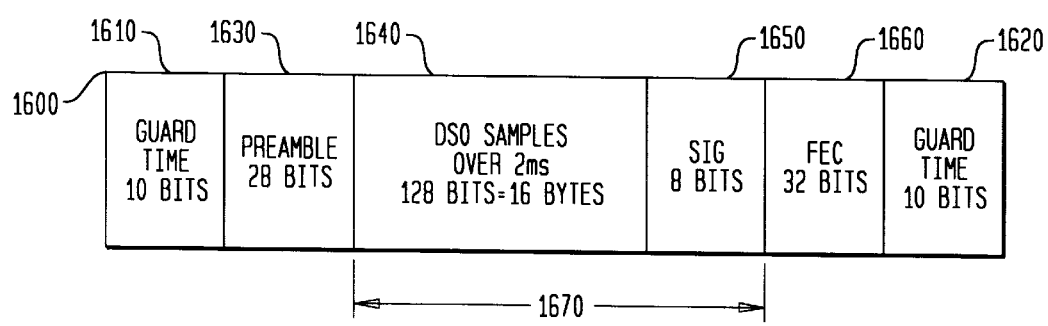
FIG. 16 is an exemplary illustration, in accordance with the present invention, for a structure of an STM upstream burst.

FIG. 16 is an exemplary illustration, in accordance with the present invention, of the structure of an STM upstream burst 1600. A ten bit guard band 1610 is included at the beginning of the burst. A twenty-eight bit preamble 1630 is also included. The STM payload 1640 is sixteen bytes. Less than four kbps bandwidth is required per DS0 connection for signaling. As a result, a one byte signaling field 1650 in the STM PDU is adequate to provide signaling capability for DS0 connections. Payload error is corrected over any two bytes of payload by using four bytes of forward error correction (FEC) 1660. FEC 1660 is provided for two regions 1670, the sixteen byte STM payload 1640 and the one byte signaling field 1650. Sixteen bytes of payload every two milliseconds provides a payload data bit transfer rate of 64,000 bps, however, the STM PDU overhead is eleven bytes long and therefore each STM PDU with payload is a total of twenty-seven bytes. A burst ending 10 bit guard band 1620 is also included in each upstream STM burst 1600.

Figure 17:
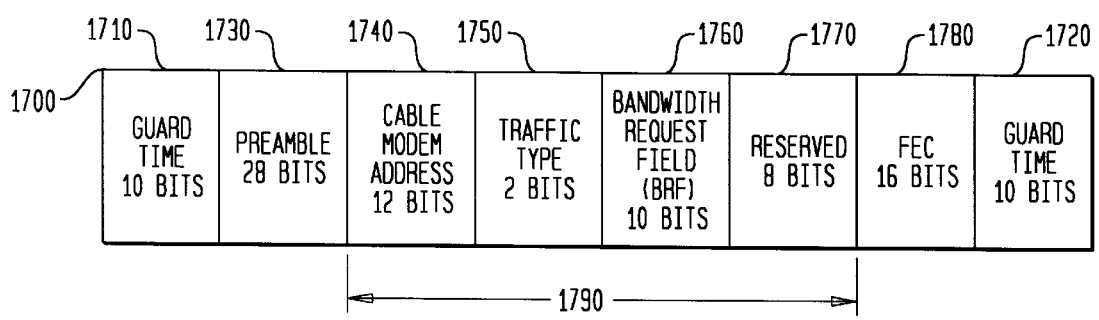
FIG. 17 is an exemplary diagram, in accordance with the present invention, for a structure of an upstream burst for pure contention.

FIG. 17 is a exemplary diagram, in accordance with the present invention, for a structure of an upstream burst for pure contention 1700, also known as a reservation request. Included as elements of a reservation request are a ten bit guard band at the burst front end 1710 and at the burst tail end 1720, and a twenty-eight bit preamble 1730. The reservation request 1700 also contains a twelve bit field identifying the sending cable modem (CM) address 1740 to the headend (HE). A two bit field indicating traffic type 1750 is also included. A bandwidth request field (BRF) 1760 is ten bits in length and sixteen bits are dedicated to FEC 1780. Finally, eight bits are reserved 1770 for future use. Forward error correction is applied over the cable modem address field 1740, the traffic type field 1750, the BRF 1760, and the reserved region 1770, and will correct any one byte within these fields 1790.

The traffic type field (TTF) 1750 specifies the type of PDU which is being transmitted upstream to the HE. A TTF 1750 value of '00' indicates that the PDU is transporting an ATM cell as payload. A TTF 1750 value of '01' indicates that the PDU is transporting a VL payload and that the VL payload is user data. A TTF 1750 value of '10' indicates that the PDU is transporting a VL payload and that the VL payload is an ADAPT control and management message. A TTF 1750 value of '11' is unassigned and reserved.

The bandwidth request field (BRF) 1760 represents a request from a specific cable modem, to the headend BM, for upstream bandwidth allocation in a future upstream frame. For subsequent transmission of upstream ATM PDUs, the BRF 1760 requests the number of upstream ATM cells which are desired to be reserved. An upstream ATM cell reservation consists of six contiguous basic slots. For subsequent transmission of an upstream VL PDU, the BRF 1760 requests the number of upstream basic slots required for transmission. Nine bits of the ten bit BRF 1760 specify the length of a request for bandwidth.

Requests are made absolutely or incrementally. An absolute request specifies the total number of basic slots or ATM cells currently awaiting transmission in a cable modem buffer. An incremental request is a request for additional bandwidth for ATM PDUs that have arrived in the CM buffer since the last request. One bit of the ten bit BRF 1760 denotes whether the request is an absolute or incremental request. The other nine bits specify the quantity of bandwidth requested.

A reservation request, transmitted upstream within a burst for pure contention 1700, is itself a payload. In essence, the BRF 1760 is a ten bit payload, subject to contention, and transmitted upstream with eighty-six bits of overhead. However, a BRF may also be transmitted upstream contained within an ATM or VL PDU. A BRF transmitted in this manner is constructed exactly the same as a BRF transmitted within a burst for pure contention. However, none of the overhead included in a burst for pure contention is included with a BRF accompanying an ATM or VL PDU, since an ATM or VL PDU already include all required information in their overhead. Furthermore, since an ATM or VL PDU are not transmitted in contention basic slots, but rather in reserved basic slots, the BRF included with an ATM or VL PDU is not subject to contention or collision. A BRF transmitted within the frame of an upstream PDU is known as a piggyback request.

Because a BRF 1760 is transmitted upstream from one of a plurality of cable modems to the headend in the contention region, the possibility of a collision is likely. A collision occurs when more than one cable modem attempts to transmit a BRF 1760 in the same basic slot of the same upstream frame. When a collision occurs, neither request is understood by the headend. Therefore, this exemplary embodiment of the present invention also includes a contention resolution mechanism to resolve any collisions. If a collision occurs between competing cable modems while transmitting a BRF 1760, each cable modem must retransmit its request in accordance with the contention resolution mechanism. One example of a contention resolution mechanism known in the art is a binary exponential back-off contention resolution mechanism. The contention resolution mechanism will be explained in greater detail in this application's description of medium access control (MAC) operation.

Figure 18:
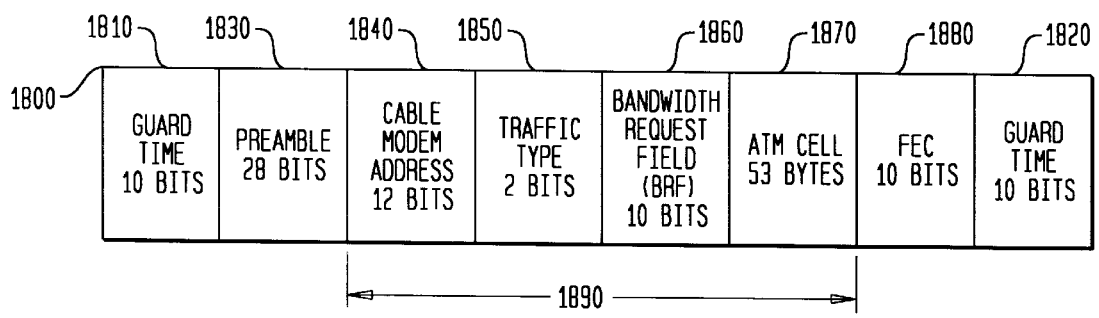
FIG. 18 illustrates an exemplary embodiment of the structure of an upstream burst for an ATM PDU with ATM cell as payload, as incorporated in accordance with the present invention.

FIG. 18 illustrates an exemplary embodiment of the structure of an upstream burst for an ATM PDU with ATM cell as payload 1800, as incorporated in accordance with the present invention. The total PHY layer burst length for an ATM burst is seventy-two bytes, fifty-three bytes for the ATM cell 1870, the remaining nineteen bytes for overhead. The headend BM allocates six contiguous basic slots for each ATM PDU upstream burst.

Included as fields within the ATM PDU are a ten bit guard band at the burst front end 1810 and at the burst tail end 1820, and a twenty-eight bit preamble 1830. In addition to the ATM cell payload 1870, the ATM PDU 1800 also contains a twelve bit field 1840 identifying the address of the transmitting cable modem to the HE. A two bit traffic type field 1850 identifies the burst to the HE as an ATM PDU with an ATM cell payload. Ten bytes are dedicated to FEC 1880, which is applied over four fields 1890; including, the cable modem address field 1840, the TTF field 1850, the BRF 1860, and the ATM cell 1870. FEC 1880 is able to correct any five bytes over the fifty-seven bytes which are forward error corrected.

A BRF 1860 is included within the upstream ATM PDU 1800. In the pure contention mode, a BRF 1860 is the payload. The BRF 1860 included in the ATM PDU 1800 however, is a piggyback request. An ATM PDU piggyback request is a request for allocation of upstream bandwidth in subsequent upstream frames, made from the transmitting CM, and requested for the transmission of ATM cell payloads. A piggyback request requires no additional overhead, since it is included as part of the ATM PDU 1800, which already possesses the requisite information and overhead. Additionally, a piggyback request is incorporated within a PDU for which the HE had already reserved bandwidth, and therefore helps reduce the demand and load in basic slots assigned for contention requests.

Figure 19:
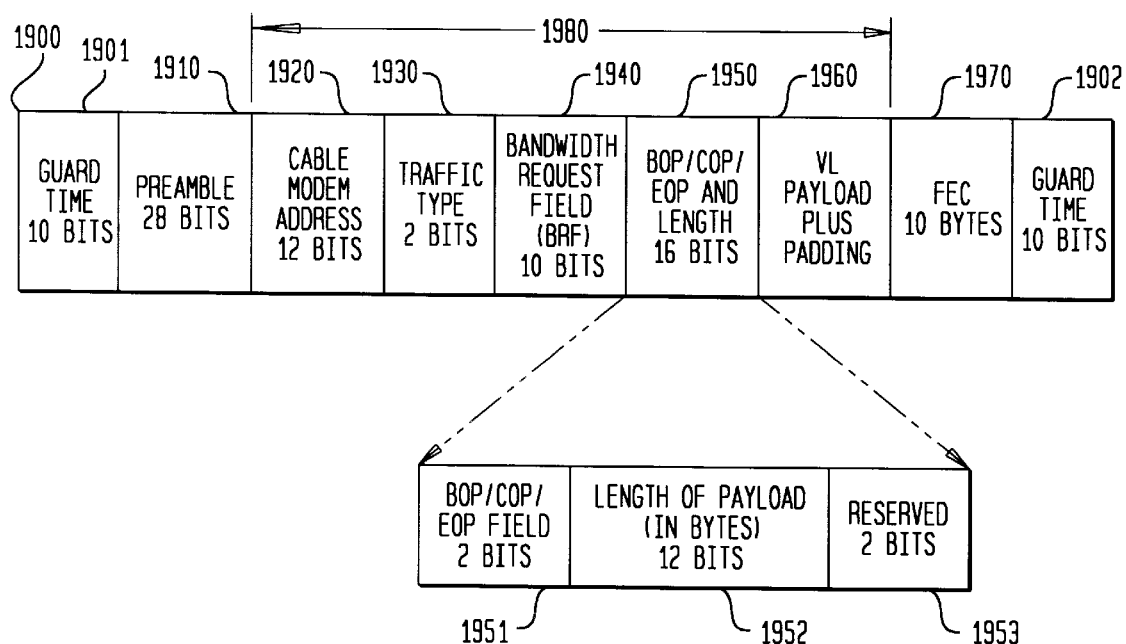
FIG. 19 illustrates an exemplary embodiment of the structure of an upstream burst for a VL PDU with VL payload, as incorporated in accordance with the present invention.

FIG. 19 illustrates an exemplary embodiment of the structure of an upstream burst for a VL PDU with VL payload 1900, as incorporated in accordance with the present invention. Included as elements of the VL PDU are a ten bit guard band at the burst front end 1901 and at the burst tail end 1902, and a twenty-eight bit preamble 1910. In addition do the VL frame payload 1960, the VL PDU 1900 also contains a twelve bit field identifying the sending cable modem (CM) address 1920 to the HE. A two bit traffic type field (TTF) 1930 identifies the burst to the HE as an VL PDU with an VL frame payload. Forward error correction (FEC) is applied over five fields 1980, including: the cable modem address field 1920, the TTF 1930, the BRF 1940, the length field 1950, and the VL payload field 1960. Ten bytes of FEC 1970 can correct any five bytes over the payload.

A ten bit BRF 1940 is included within the upstream VL PDU 1900. In the pure contention mode, a BRF is the payload. The BRF 1940 included in the VL PDU 1900 however, is a piggyback request. An VL PDU piggyback request is a request for allocation of upstream bandwidth in subsequent upstream frames, made from the transmitting CM, and requested for the transmission of VL payloads. A piggyback request requires no additional overhead, since it is included as part of the VL PDU 1900, which already possesses the requisite information and overhead. Additionally, a piggyback request is incorporated within a PDU for which the HE had already reserved bandwidth, thereby decreasing the loading of and demand for basic slots assigned for contention requests.

Also included within the VL PDU is a two byte length field 1950. The length field 1950 contains a two bit BOP/COP/EOP subfield 1951, a twelve bit length subfield 1952, and two bits 1953 reserved for future use. The length subfield 1952 describes the payload length in bytes. Twelve bits can therefore describe a VL frame size up to 4095 bytes. When basic slots have been reserved for upstream VL payloads, the minimum allocation for VL frames within a frame will be two basic slots, or twenty-four bytes. With larger VL frames, the headend BM allocates as many contiguous blocks of basic slots as possible.

Because VL PDUs vary in size and can extend beyond the boundaries of a frame or masterframe, the BOP/COP/EOP subfield 1951 is used to describe to the headend BM whether the attached burst is the beginning, continuation, or end of an VL frame. If the associated VL frame is too long to completely transmit within the allocated bandwidth of one upstream burst, and the payload to be transmitted is the beginning of a new VL frame, then the BOP/COP/EOP subfield 1951 bits are set to '00' to indicate that this payload is the beginning of an VL frame and that the entire VL frame will not be transmitted in this burst. If a portion of an VL frame has already been transmitted in a previous upstream burst and the remainder of the frame is still too long to completely transmit within the allocated bandwidth of the current upstream burst, then the BOP/COP/EOP subfield 1951 bits are set to '01' to indicate that this payload is a continuation of a VL frame and that the entire VL frame will not be transmitted in this burst. If a portion of an VL frame has already been transmitted in previous upstream bursts and the remainder of the VL frame is capable of being transmitted within the allocated bandwidth of the current upstream burst, then the BOP/COP/EOP subfield 1951 bits are set to '10' to indicate that this payload is a continuation of a VL frame and that the entire VL frame will be transmitted in this burst. Finally, if a portion of a VL frame has not been transmitted in a prior upstream burst, and the VL frame is short enough that the entire VL frame is capable of being transmitted within the allocated bandwidth of the current upstream burst, then the BOP/COP/EOP subfield 1951 bits are set to '11' to indicate that a complete VL frame is being transmitted in one upstream VL PDU payload.

For example, suppose a CM is about to transmit a VL frame containing 400 bytes of payload upstream to the HE. Assuming the headend BM can and has allocated up to 204 bytes (17 basic slots) for this communication in each of three successive upstream frames (frames $n_0$, $n_1$, and $n_2$), then the CM transmits 204 bytes of the VL PDU with payload upstream in frame no. The BOP/COP/EOP field associated with the VL burst in frame $n_0$ is set to '00' to indicate that the beginning, but not a complete VL payload is being transmitted this frame. Since an upstream VL PDU burst contains twenty-one bytes of overhead, only 183 bytes of the VL frame are actually transmitted in frame $n_0$, leaving 217 bytes of the VL frame in the CM buffer to be transmitted in the following upstream frames. In frame $n_1$ the CM transmits the next 204 bytes of the VL PDU with payload upstream in frame $n_0$. The BOP/COP/EOP field associated with the VL burst in frame $n_1$ is set to '01' to indicate that a continuation of the VL frame is being transmitted, but not the remainder of the VL payload. Since an upstream VL PDU burst contains twenty-one bytes of overhead, only the next 183 bytes of the VL frame are actually transmitted in frame $n_1$, leaving thirty-four bytes of the VL frame in the CM buffer to be transmitted in the following upstream frame. Finally, in frame $n_2$, the CM transmits the remaining portion of the VL frame payload. Total required upstream bandwidth is sixty bytes (five basic slots), thirty-four bytes for the remaining VL payload, twenty-one bytes overhead, and five bytes for padding (to round the PDU to an integral multiple of basic slots). The BOP/COP/EOP field associated with frame $n_2$ is set to '10' to indicate the complete remainder of the VL frame is being transmitted in frame $n_2$.

Figure 20:
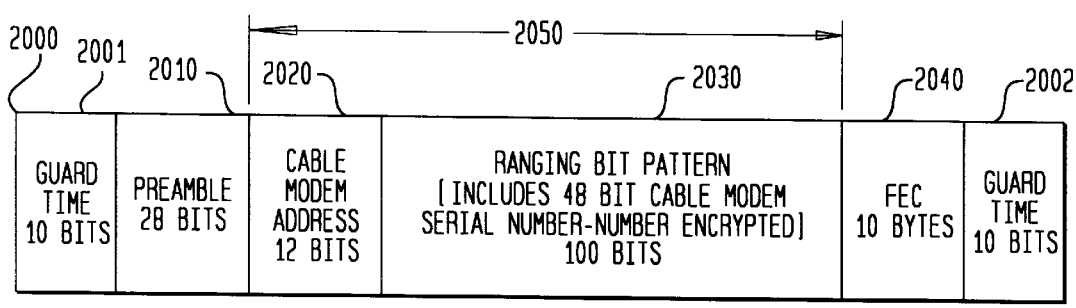
FIG. 20 illustrates an exemplary embodiment of the structure of a ranging upstream burst, an example of a message transmitted within a contention superslot, as incorporated in accordance with the present invention.

FIG. 20 illustrates an exemplary embodiment of the structure of a ranging upstream burst 2000, an example of a message transmitted within a contention superslot, as incorporated in accordance with the present invention. A contention superslot is created by the bandwidth manager (BM) for the purpose of transmitting upstream slow control (USC) messages. Upstream control, management, and signaling messages are referred to as USC messages, and are nominally transmitted in a contention superslot. Some illustrative examples of USC messages are 'power on' or 'off-hook' indication by a CM, ranging messages, etc. A USC message is comprised of a front end and a tail end guard band, a preamble, a cable modem address, and the control message.

A contention superslot is formed by combining six contiguous basic slots. The frequency and location of a superslot within an upstream frame is determined by the headend BM. The headend BM informs the cable modems that a USC superslot will be available in the next upstream frame by transmitting a reservation message in the downstream MAP field. The reservation message is assigned the cable modem address of '1111 1111 1110' . When a CM identifies this address, it interprets that it indicates a USC superslot will be available and can be accessed via the contention mode by any CM having a control or signaling message to transmit.

The USC superslot is accessed by cable modems in a contention mode only. Therefore, collisions of USC superslot PDUs are likely. The threat of a collision is not of a great concern however, since control and signaling messages are infrequent and sporadic in nature. Additionally, utilization of the contention mode limits access delays for control and signaling messages for two reasons. First, successful transmission in the contention region on a first transmission attempt provides immediate message delivery without the necessity of a reservation request. Second, the total demand for a USC channel with which to transmit upstream a control or signaling message is typically very low, approximately five to ten percent of the USC channel bandwidth.

The USC message illustrated in FIG. 20 is that of an upstream ranging burst 2000, a type of message transmitted within a USC superslot. A USC PDU contains a ten bit front end guard time field 2001, a ten bit tail end guard time field 2002, a twenty-eight bit preamble, a twelve bit cable modem address 2020, a control or signaling message, and thirty-two bits of FEC 2040. FEC over two regions 2050; the cable modem address 2020 and the USC message 2030 result in payload error correction of any two bytes. The ranging bit pattern for this upstream ranging burst 2000 is the USC message payload. The payload for a ranging burst is 100 bits in length, including an encrypted forty-eight bit cable modem serial number, generating a total ranging burst PDU length of 192 bits (24 bytes or 2 basic slots). In general, a USC PDU extends over all six basic slots allocated. A ranging burst is an exception to this general rule and can be transmitted anywhere within the span of a contention superslot.

Contention Transmission and Collision Resolution

Figure 21:
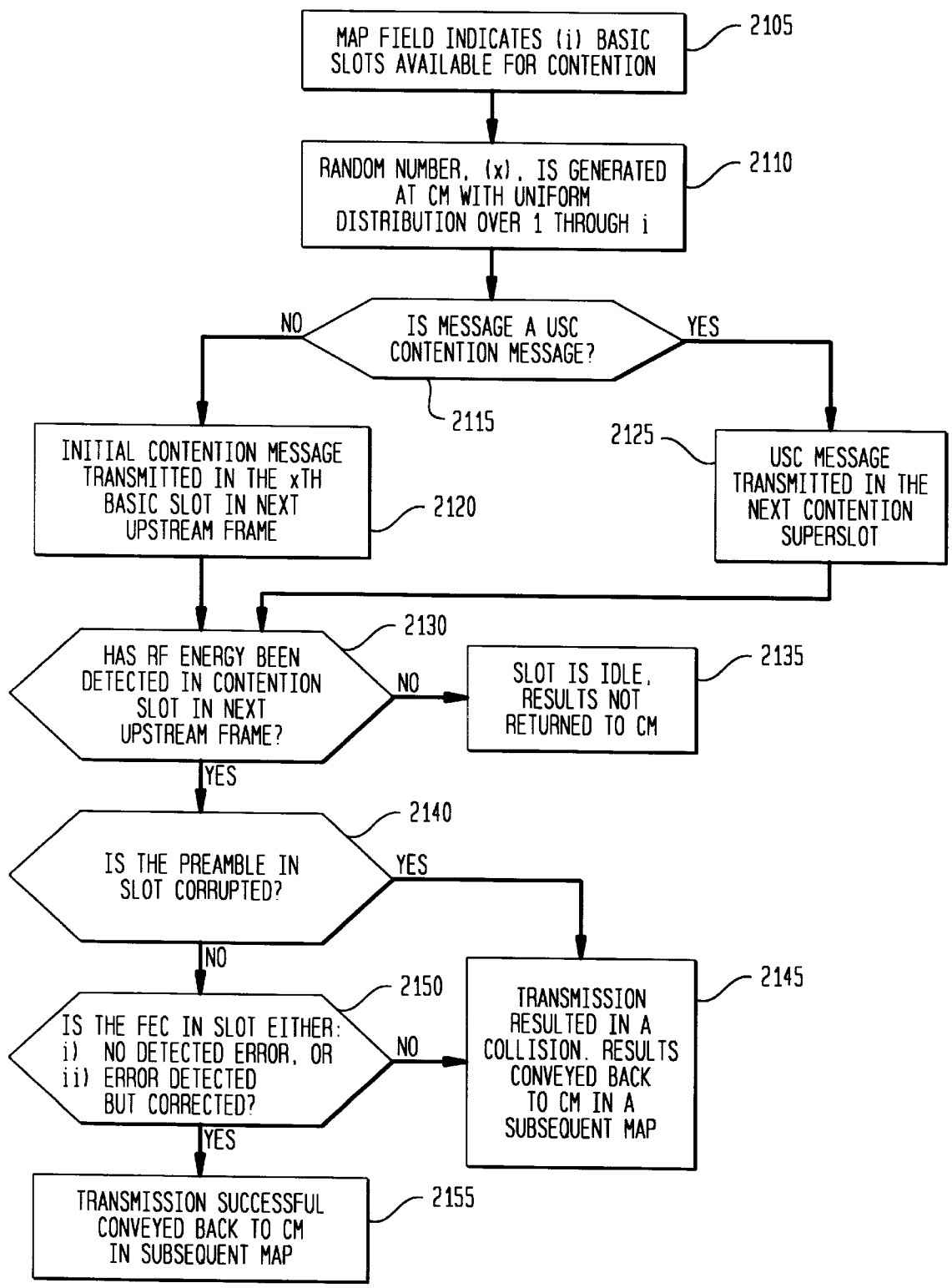
FIG. 21 is a flow diagram illustrating an exemplary contention transmission and collision detection process, in accordance with the present invention.

FIG. 21 is a flow diagram illustrating an exemplary upstream collision resolution process, in accordance with the present invention. Recall that the MAP field transmitted by the HE conveys to the cable modems which upstream basic slots are available for contention transmission in the next frame. When more than one CM attempts to transmit upstream within the same basic slot, or within the same USC superslot, a collision occurs. A collision results in the corruption of data from both cable modems, and both must retransmit in order to send their original messages to the headend. Therefore, the HE utilizes a collision detection algorithm to detect when a collision has occurred and to transmit to the individual cable modems whether or not their contention burst was successful.

In step 2105, the MAP field indicates that there are i basic slots available for contention in the next frame. The cable modem generates a random integer, x, in accordance with step 2110. The value of x is uniformly distributed over the values one through i. The question is then asked, in step 2115, whether or not the message to be transmitted is a upstream slow control (USC) contention message. If the message to be transmitted upstream is not a USC message, then the contention message is transmitted in the xth basic slot of the asynchronous contention region in the next upstream frame, as per step 2120. If the message to be transmitted upstream is a USC message, then it is transmitted upstream in the next contention superslot, as directed by step 2125. The headend (HE) monitors for RF energy in each contention basic slot and superslot. If RF energy is not detected in step 2130, then the slot is idle. Idle slot results are not returned to the cable modems, as indicated in step 2135. If RF energy is detected, then step 2140 instructs to check whether the preamble is corrupted. If the preamble is corrupted, a collision is indicated and step 2145 directs that the HE report back to the cable modem that a collision has occurred. The collision is reported in the MAP field, which is conveyed as part of the fast control field (FCF). If the result of step 2140 is negative and the preamble is not corrupted, however, then step 2150 examines the forward error correction (FEC) for that slot and if no error is detected, or if an error is detected but corrected, the transmission is successful. Step 2155 conveys to the sending cable modem, via the MAP, field that the transmission of the contention message was successful. If the answer to step 2150 is negative, then a transmission collision is indicated and step 2145 directs that the HE report back to the cable modem that a collision has occurred. The collision is reported in the MAP field.

Figure 22:
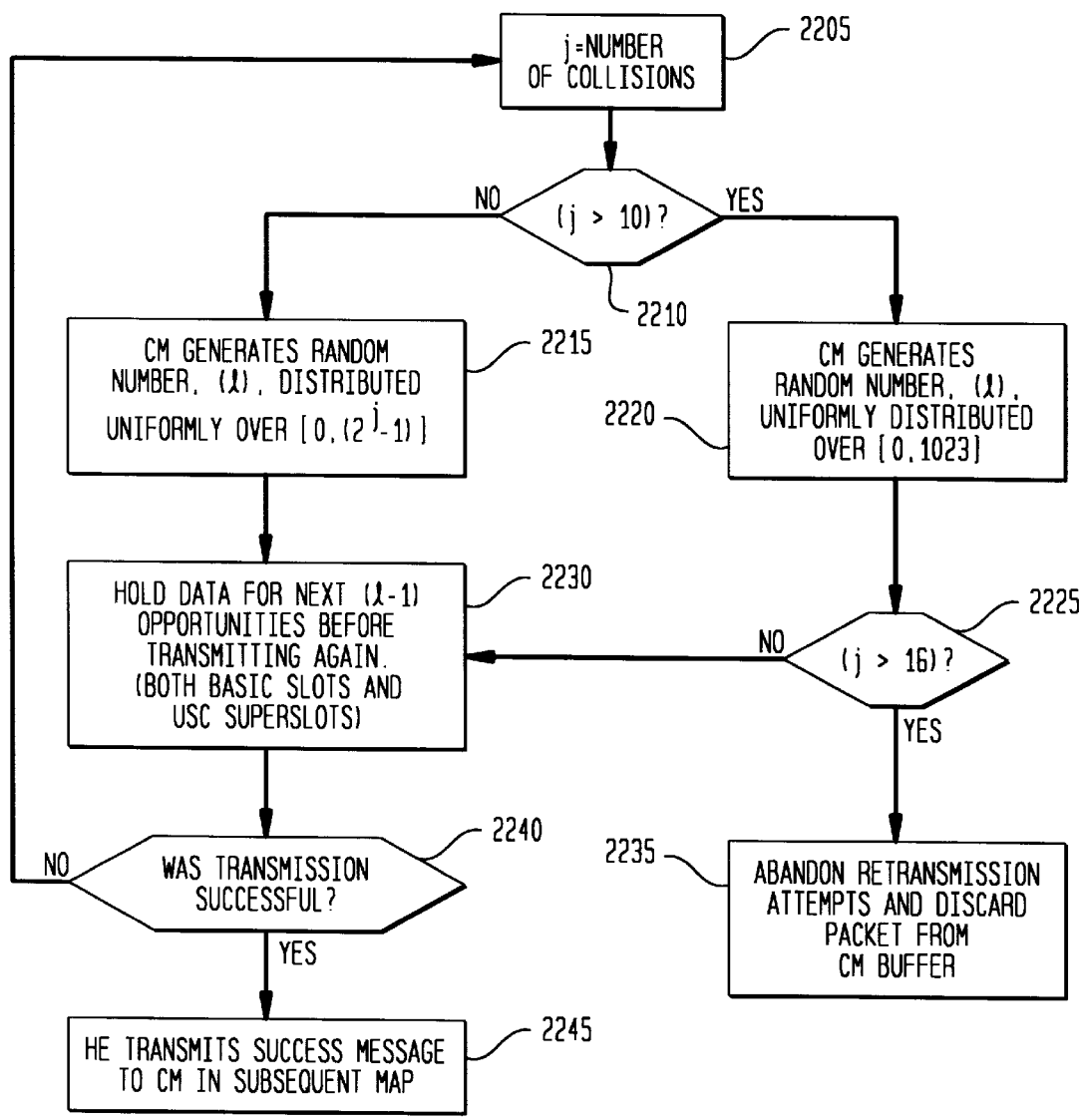
FIG. 22 is a flow diagram illustrating an exemplary retransmission process, for use when upstream contention messages result in a collision, and utilizing a binary-exponential backoff algorithm.

FIG. 22 is a flow diagram illustrating an exemplary retransmission process, for use when upstream contention messages result in a collision, and utilizing a binary-exponential backoff algorithm. When an upstream contention message results in a collision, the cable modems that were affected by the collision retransmit their message. The present invention utilizes a binary exponential backoff algorithm to control the retransmission of contention messages. In step 2205, the cable modem attempting to retransmit an upstream contention message first sets the variable j equal to the number of collisions the message has currently encountered. If, in accordance with step 2210, less than ten collisions have been encountered, then step 2215 directs the CM to generate a random number, l, uniformly distributed over the range from zero through ($2^j$–1). If greater than ten collisions have been encountered during the retransmission of one message, then step 2220 directs the CM to generate a random number, l, uniformly distributed over the range from zero to 1023. Step 2225 checks if the number of collisions, j, is greater than sixteen. If greater than sixteen collisions have occurred, then step 2235 directs that retransmission attempts for the upstream contention message should be abandoned and that the message should be discarded from CM buffer memory. However, if the result of step 2225 is negative, then step 2230 is performed. Step 2230 is also performed as a natural consequence of completing step 2215. Step 2230 directs that the upstream contention message should be held for the next (l–1) opportunities of the same kind (either a basic slot or a USC superslot) before transmitting it again. The previously collided message is then retransmitted in the next contention slot opportunity. If transmission was successful, then, in accordance with step 2245, the HE transmits a success message to the transmitting CM in a subsequent MAP. If, however, the answer to step 2240 is negative, then the retransmission process starts again at step 2205.

Method and Order of Scrambling and FEC

Another unique feature of the present invention is the method and order in which scrambling and FEC are accomplished. Referring once more to FIG. 2, transmitted data is passed through a scrambler 213 prior to application of FEC 215 and conversely at the receiver, data is verified correct with FEC 255 prior to passing through the descrambler 257. Although the feature of scrambling prior to applying FEC at the transmitter and descrambling after verifying FEC at the receiver is applied in this illustrative example over a broadband HFC network, the present invention may be applied to any system incorporating a scrambler and FEC coder at the transmitting location and a descrambler and FEC decoder at the receiving location, including other point to multipoint, multipoint to multipoint, multipoint to point, and point to point data or multimedia transmission systems, and over a variety of mediums in addition to HFC including cellular wireless, digital direct wireless, coaxial cable, fiber optic, and twisted pair, as would be apparent to those skilled in the art.

One embodiment of the present invention incorporates a self synchronous scrambler prior to application of FEC, although the present invention functions equally well with scramblers which are subframe or externally synchronized. One advantage of incorporating a self synchronous scrambler within the present invention, however, is that an externally synchronized scrambler is inherently more vulnerable to malicious attack if an attacker is able to identify the subframe, frame, or masterframe boundaries. At the receiver, decoding/deinterleaving is followed by a descrambler. In order to maintain bit count integrity for the descrambler and to avoid error propagation, the FEC decoder/deinterleaver at the receiver passes all the decoded bits to the descrambler, even if uncorrectable errors are discovered. Descrambling is disabled when a cable modem is hunting to regain synchronization to the subframe boundary. Descrambling is resumed when synchronization is reestablished.

Figure 23:
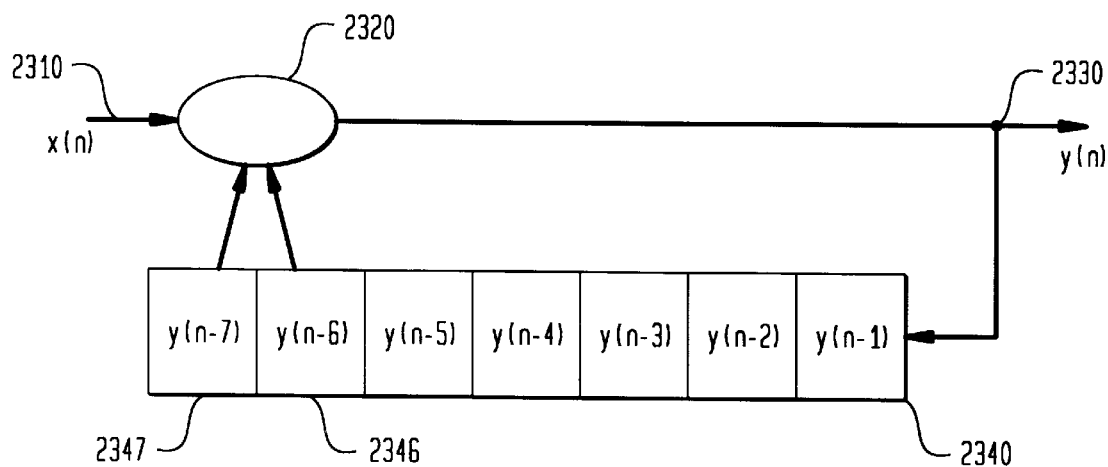
FIG. 23 illustrates an exemplary embodiment of a scrambler utilizing a seventh order scrambling polynomial.

FIG. 23 illustrates an exemplary embodiment of a scrambler utilizing a seventh order scrambling polynomial, specifically:

$$y(n)=[x(n)+y(n-6)+y(n-7)] \bmod 2.$$

An input bit, x(n) 2310, is one input to a modulo 2 summer 2320. The output of the summer 2320 is y(n) 2330, which is sent to the FEC encoder as well as to a shift register 2340. The shift register 2340 is utilized to implement the scrambling polynomial by providing two additional inputs to the modulo 2 summer 2320; y(n–6) 2346 and y(n–7) 2347. In this manner, y(n) 2330 is a function of x(n) 2310, y(n–6) 2346, and y(n–7) 2347.

Figure 24:
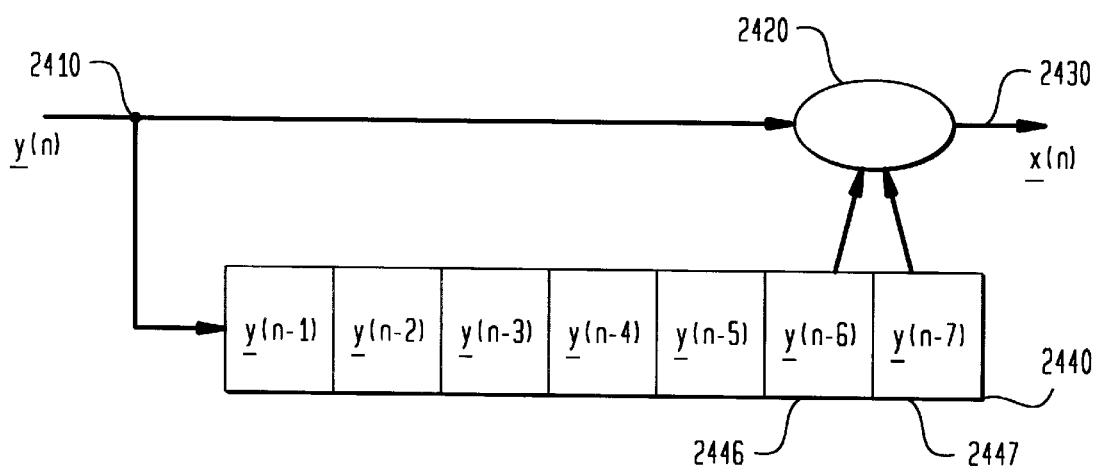
FIG. 24 illustrates an exemplary embodiment of a descrambler utilizing a seventh order scrambling polynomial.

FIG. 24 illustrates an exemplary embodiment of a descrambler utilizing a seventh order descrambling polynomial, specifically:

$$\underline{x}(n)=[\underline{y}(n)+\underline{y}(n-6)+\underline{y}(n-7)] \bmod 2.$$

The input to the descrambler, $\underline{y}(n)$ 2410, is distinguished from the output of the scrambler, y(n), in that an error changing its bit value may have occurred between transmission and reception. Therefore, ideally and without any bit transmission corruption, the output of the scrambler at the transmitter, y(n), would always equal the corresponding bit input to the descrambler, $\underline{y}(n)$ 2410. Descrambler bit output, $\underline{x}(n)$ 2430, is likewise differentiated from the bit input to the transmitter scrambler, x(n), since $\underline{x}(n)$ 2430 is dependent upon the value of $\underline{y}(n)$ 2410, and a corrupted value of $\underline{y}(n)$ 2410 may result in the corruption of the corresponding descrambler bit output, $\underline{x}(n)$ 2430.

The descrambler input bit, $\underline{y}(n)$ 2410, already subjected to FEC verification and correction at the receiver, is one input to a modulo 2 summer 2420. The output of the summer 2420 is $\underline{x}(n)$ 2430, which is directed to a shift register 2440. The shift register 2440 is utilized to implement the descrambling polynomial by providing two additional inputs to the modulo 2 summer 2420; $\underline{y}(n-6)$ 2446 and $\underline{y}(n-7)$ 2447. In this manner, $\underline{x}(n)$ 2430 is a function of $\underline{y}(n)$ 2410, $\underline{y}(n-6)$ 2446, and $\underline{y}(n-7)$ 2447.

When a transmission error is encountered, the received bit value, $\underline{y}(n)$, is not equal to the transmitted bit value, y(n). In an exemplary conventional system utilizing a seventh order scrambling/descrambling polynomial, the transmitted bit value is first descrambled prior to application of FEC. Descrambling $\underline{y}(n)$ causes an error in three bit values due to the effects of error spreading. Specifically, $\underline{x}(n)$, $\underline{x}(n+6)$, and $\underline{x}(n+7)$ are all in error, due to their mutual reliance on the accuracy of received bit value $\underline{y}(n)$. Mathematically, the relationship between descrambled bit variables and a received bit variable may be related as:

$$\underline{x}(n)=[\underline{y}(n)+y(n-6)+\underline{y}(n-7)] \bmod 2;$$

$$\underline{x}(n+6)=[\underline{y}(n+6)+\underline{y}(n)+\underline{y}(n-1)] \bmod 2;$$

and $$\underline{x}(n+7)=[\underline{y}(n+7)+\underline{y}(n+1)+\underline{y}(n)] \bmod 2.$$

Referring once again to FIG. 13, one ADAPT subframe of 480 bytes is represented over 125 μs. As previously described, a framing byte 1310 is incorporated within each subframe. Also included in each subframe are eight bytes for forward error correction. This space is divided into two error correction syndromes, FEC0 1340 and FEC1 1350, each four bytes long. Therefore 471 bytes remain for the payload itself, whether allocated within the STR 1320, the asynchronous information and control region 1330, or a combination of both. Each of the two FEC syndromes are able to independently identify and correct up to two bytes of data error using this scheme. Each byte of the 471 byte subframe is classified as an odd or even byte, and one FEC syndrome is calculated from odd numbered bytes while the second FEC syndrome is calculated from even numbered bytes. Each of these two blocks is Reed Solomon coded with four bytes of FEC overhead, thus creating a 240 and a 239 byte FEC coded payloads. However, the data included in each payload maintains the original bit and byte order it possessed after scrambling. Only the FEC syndrome itself is subject to byte-wise interleaving. Although a Reed Solomon coding scheme is utilized for FEC in one embodiment of the present invention, other methods for FEC may also be used, as would be apparent to those skilled in the art. Additionally, the present invention is equally well applied to FEC schemes requiring varying degrees of dedicated FEC overhead, as would also be apparent to those skilled in the art. Dedicating a greater quantity of bytes for FEC will allow a greater quantity of bytes in error to be corrected at the receiver. Dedicating a lessor quantity of bytes for FEC will allow a lessor quantity of bytes in error to be corrected at the receiver.

A unique feature of the present invention is implementation at the transmitter, of the scrambling function first, followed by the FEC encoding scheme and at the receiver, first applying FEC decoding and correction prior to descrambling. This ordering and arrangement of scrambling and FEC functions prevents the error spreading property of the scrambler and descrambler from affecting the correction capability of the FEC coder and decoder. Two examples follow which demonstrate the error spreading property associated with conventional systems, that is, systems which first calculate FEC at the transmitter and then scramble data to maintain appropriate symbol density.

Figure 25:
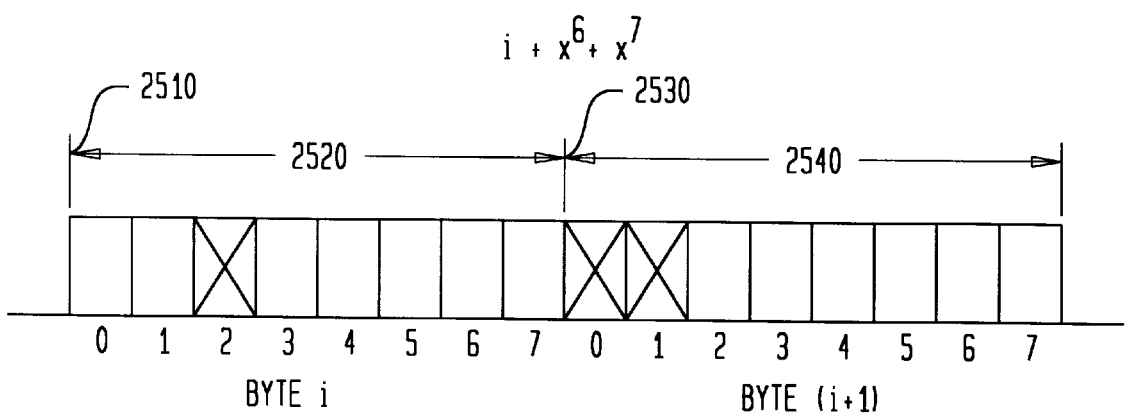
FIG. 25 is an illustration of bit error spread encountered with conventional FEC and scrambler ordering implemented with a seventh order scrambling polynomial.

FIG. 25 is an exemplary illustration of bit error spread encountered with conventional FEC and scrambler ordering implemented with a seventh order scrambling polynomial. Depicted in this illustration are two contiguous bytes from the descrambler bytestream output, byte i 2520, beginning at leading bit edge 2510, and byte (i+1) 2540, beginning at leading bit edge 2530. The scrambling/descrambling polynomial utilized in this example is: $(1+x^6+x^7)$, and therefore a transmission error in bit 2 of byte i 2520 will also result in a scrambler bit output error at bit 0 of byte (i+1) 2540 and bit 1 of byte (i+1) 2540, those bits being processed six bits and seven bits respectively subsequent to bit 2 of byte i 2520. Since a conventional order of scrambling and FEC decoding is utilized in this example, and since the method of FEC has a two byte error correcting capability, a single bit error in transmitted data results in three bits of corrupted data spread over two bytes of descrambler output, and the FEC error correcting capacity of two bytes is completely exhausted. Another error occurring in a third byte would cause the FEC correction capability to be exceeded and thereby result in errors at the FEC decoder output.

Figure 26:
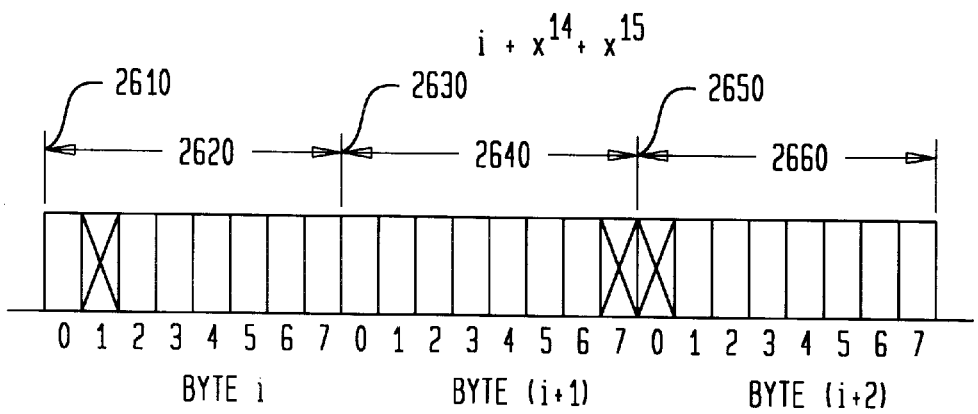
FIG. 26 is an illustration of bit error spread encountered with conventional FEC and scrambler ordering implemented with a fifteenth order scrambling polynomial.

FIG. 26 is an illustration of a second example of bit error spreading encountered with conventional FEC and scrambler ordering, this example implemented with a fifteenth order scrambling polynomial. Depicted in this illustration are three contiguous bytes from the descrambler bytestream output, byte i 2620, beginning at leading bit edge 2610, byte (i+1) 2640, beginning at leading bit edge 2630, and byte (i+2) 2660, beginning at leading bit edge 2650. The scrambling/descrambling polynomial utilized in this example is: $(1+x^{14}+x^{15})$, and therefore an error in bit 1 of byte i 2620 will also result in a bit error in bit 7 of byte (i+1) 2640 and bit 0 of byte (i+2) 2660, those bits being processed fourteen bits and fifteen bits respectively subsequent to bit 1 of byte i 2620. Since a conventional order of scrambling and FEC decoding is utilized in this example, and since the method of FEC has a two byte error correcting capability, a single bit error in transmitted data results in three bits of corrupted data, in this case spread over three bytes of descrambler output, and therefore the FEC error correcting capacity of two bytes is exceeded.

In contrast with the results of the above examples, preceding the FEC encoder with the scrambler at the transmitter (and consequently following the FEC decoder with the descrambler at the receiver), in accordance with the present invention, prevents bit error spreading because FEC correction is applied at the receiver prior to descrambling. Therefore, transmitted bit errors are corrected with the application of FEC at the receiver prior to the deleterious effects associated with bit error spreading.

In one embodiment of the present invention, the framing byte, in addition to FEC0 and FEC1 syndrome bytes, are not scrambled. For example, as implemented within the ADAPT subframe structure previously described, 471 data bytes of a 480 byte subframe are scrambled. Scrambling is performed to ensure that there is an adequate one's density to prevent receiver drift. However, not scrambling the FEC syndrome bytes and the framing bytes will not cause a receiver drift problem. First, the framing byte is of the form '101uwxyz.' A fixed marker pattern (FMP), the first three bits of each framing byte, is fixed to allow for initial component synchronization as well as component synchronization after a loss of synchronization, as previously described. However, the specific values of the FMP, '101,' are chosen to ensure that each framing byte contains at least two transitions from '1' to '0' or from '0' to '1.' Therefore, scrambling of the framing byte to alter the one's density is not required. The remaining eight bytes associated with FEC, concatenated at the end of each subframe, and just preceding the framing byte of the next successive subframe are also unscrambled. Not scrambling eight bytes out of the 480 bytes associated with a subframe is not expected to cause a receiver drift problem.

Numerous modifications and alternative embodiments of the invention will be apparent to those skilled in the art in view of the foregoing description. Accordingly, this description is to be construed as illustrative only and is for the purpose of teaching those skilled in the art the best mode of carrying out the invention and is not intended to illustrate all possible forms thereof. It is also understood that the words used are words of description, rather than limitation, and that details of the structure may be varied substantially without departing from the spirit of the invention and the exclusive use of all modifications which come within the scope of the appended claims are reserved.

What is claimed is:

1. A method for transmission of scrambled and forward error corrected data from a transmitter to a receiver over a transmission medium, said method comprising the steps of:

(A) scrambling data to be transmitted to produce scrambled data, wherein said scrambled data has a given number of bit transitions to maintain synchronization between said transmitter and said receiver;

(B) applying a forward error correction (FEC) scheme to said scrambled data, said scheme determining an FEC syndrome; said step of applying an FEC scheme to said scrambled data further comprising:

classifying each byte of said scrambled data into a first group and a second group, said first group corresponding to said scrambled data being odd numbered bytes, said second group corresponding to said scrambled data being even numbered bytes;

computing a first FEC number from said scrambled data of said first group;

computing a second FEC number from said scrambled data of said second group;

byte-wise interleaving said first FEC number and said second FEC number; and appending said first FEC number and said second FEC number to said scrambled data, said scrambled data order remaining undisturbed by application of said FEC scheme; and (C) transmitting said scrambled data and said FEC syndrome to said receiver for application at said receiver, wherein the order of applying said FEC scheme subsequent to scrambling said data to be transmitted prevents bit error spreading.

2. The method in accordance with claim 1 wherein said transmission medium is a hybrid fiber/coax medium.

3. The method in accordance with claim 2 wherein said hybrid fiber/coax medium is a bi-directional medium.

4. The method in accordance with claim 1 wherein said transmission medium is a cellular wireless medium.

5. The method in accordance with claim 1 wherein step of said scrambling data to be transmitted is implemented utilizing a shift register configured to operate as a scrambling polynomial.

6. A multiservice transmission system for digital information transport, said multiservice transmission system including a transmitter, a transmission medium, and a receiver, said multiservice transmission system providing for forward error correction and scrambling/descrambling, said multiservice transmission system comprising:

a scrambler, located at said transmitter, said scrambler producing a scrambled data output wherein said scrambled data output has a given number of bit transitions to maintain synchronization between said transmitter and said receiver;

a forward error correction (FEC) encoder, located at said transmitter, said FEC encoder applying an algorithm to said scrambled data output and calculating an FEC syndrome, said transmitter transporting said scrambled data output and said FEC syndrome over said transmission medium to said receiver;

an FEC decoder, located at said receiver, for identifying and correcting bit errors introduced to said scrambled data output during said transmission over said transmission medium;

said FEC encoder is operable to classify each byte of said scrambled data into either a first group or a second group, said first group pertaining to said scrambled data having odd numbered bytes, said second group pertaining to said scrambled data having even numbered bytes;

said FEC encoder is further operable to compute a first FEC number from said scrambled data of said first group;

said FEC encoder is further operable to compute a second FEC number from said scrambled data of said second group;

said FEC encoder byte-wise interleaves said first FEC number and said second FEC number;

said scrambled data order remains undisturbed by operations performed by said FEC encoder; and a descrambler, located at said receiver, for descrambling said scrambled data output, wherein applying data to said scrambler prior to said FEC encoder at said transmitter, and applying data to said FEC decoder prior to said descrambler at said receiver, prevents bit error spreading.

7. The multiservice transmission system in accordance with claim 6 wherein said scrambler and said descrambler are implemented via a scrambling polynomial utilizing a shift register.

8. The multiservice transmission system in accordance with claim 6 wherein a system configuration is selected from the group consisting of a multipoint to multipoint transmission system, a point to multipoint transmission system, a multipoint to point transmission system, and a point to point transmission system.

9. The multiservice transmission system in accordance with claim 6 wherein said transmission medium is a hybrid fiber/coax medium.

10. The multiservice transmission system in accordance with claim 6 wherein said transmission medium is a cellular wireless medium.

11. A method for transmission of multiple service, multiple mode scrambled and forward error corrected data from a transmitter to a receiver, said method comprising the steps of:

(A) dividing said transmission into a series of successive time subframes;

(B) scrambling data to be transmitted, said scrambling producing scrambled data wherein said scrambled data has a given number of bit transitions to maintain synchronization between said transmitter and said receiver;

(C) applying a forward error correction (FEC) algorithm to said scrambled data, said algorithm determining an FEC syndrome; said step of applying an FEC algorithm to said scrambled data further comprising:

(i) classifying each byte of said scrambled data into a first group and a second group, said first group pertaining to said scrambled data having odd numbered bytes, said second group pertaining to said scrambled data having even numbered bytes;

(ii) computing a first FEC number from said scrambled data of said first group;

(iii) computing a second FEC number from scrambled data of said second group;

(iv) byte-wise interleaving said first FEC number and said second FEC number;

(v) incorporating said first FEC number and said second FEC number within said time subframe; and (vi) incorporating said scrambled data within said time subframe, said scrambled data order remaining undisturbed by application of said FEC algorithm;

(D) incorporating said scrambled data with said FEC syndrome within a time subframe;

(E) transmitting said time subframe to said receiver;

removing said FEC syndrome from said time subframe and decoding said FEC syndrome at said receiver;

(F) identifying and correcting bit errors introduced during transmission of said scrambled data at said receiver by applying said FEC syndrome; and (G) removing said scrambled data from said time subframe and descrambling said scrambled data at said receiver, said descrambling producing descrambled data.

12. The method in accordance with claim 11 wherein said time subframe additionally transports a plurality of framing bits, said plurality of framing bits enabling receiver synchronization to said subframe boundary.

13. The method in accordance with claim 12 wherein said FEC algorithm is not applied to said plurality of framing bits.

14. The method in accordance with claim 13 wherein said plurality of framing bits includes a plurality of fixed bits, each of said plurality of fixed bits providing consecutive bit state transitions, said consecutive bit state transitions provided to prevent receiver drift.

* * * * *